US009745224B2

(12) United States Patent
Hill et al.

(10) Patent No.: US 9,745,224 B2
(45) Date of Patent: Aug. 29, 2017

(54) INORGANIC POLYMER/ORGANIC POLYMER COMPOSITES AND METHODS OF MAKING SAME

(71) Applicant: Boral IP Holdings (Australia) Pty Limited, Sydney (AU)

(72) Inventors: Russell L. Hill, San Antonio, TX (US); Russ Majors, San Marcos, TX (US)

(73) Assignee: Boral IP Holdings (Australia) PTY Limited, North Sydney (AU)

( * ) Notice: Subject to any disclaimer, the term of this patent is extended or adjusted under 35 U.S.C. 154(b) by 476 days.

(21) Appl. No.: 14/345,508

(22) PCT Filed: Oct. 5, 2012

(86) PCT No.: PCT/US2012/058852
§ 371 (c)(1),
(2) Date: Mar. 18, 2014

(87) PCT Pub. No.: WO2013/052732
PCT Pub. Date: Apr. 11, 2013

(65) Prior Publication Data
US 2014/0349104 A1 Nov. 27, 2014

Related U.S. Application Data

(60) Provisional application No. 61/544,474, filed on Oct. 7, 2011.

(51) Int. Cl.
| | | |
|---|---|---|
| *C04B 18/08* | (2006.01) | |
| *B05D 7/00* | (2006.01) | |
| *B32B 5/18* | (2006.01) | |
| *B32B 13/12* | (2006.01) | |
| *B32B 27/40* | (2006.01) | |
| *C04B 22/06* | (2006.01) | |
| *C04B 24/04* | (2006.01) | |
| *C04B 28/00* | (2006.01) | |
| *C04B 111/00* | (2006.01) | |
| *C04B 103/10* | (2006.01) | |

(52) U.S. Cl.
CPC ............... *C04B 18/08* (2013.01); *B05D 7/52* (2013.01); *B32B 5/18* (2013.01); *B32B 13/12* (2013.01); *B32B 27/40* (2013.01); *C04B 22/062* (2013.01); *C04B 24/04* (2013.01); *C04B 28/006* (2013.01); *B32B 2250/02* (2013.01); *B32B 2250/24* (2013.01); *B32B 2266/0278* (2013.01); *B32B 2375/00* (2013.01); *B32B 2419/00* (2013.01); *B32B 2607/00* (2013.01); *C04B 2103/10* (2013.01); *C04B 2111/00612* (2013.01); *Y02P 40/165* (2015.11); *Y02W 30/92* (2015.05); *Y10T 428/24999* (2015.04); *Y10T 428/31598* (2015.04)

(58) Field of Classification Search
CPC ....... C04B 18/08; C04B 24/04; C04B 22/062; C04B 2103/10; B32B 13/12; B32B 27/40; B32B 2250/02; B32B 2250/24; B32B 2375/00; B32B 2419/00; B05D 7/52
USPC ............ 428/323, 319.1, 446, 425.5; 427/403
See application file for complete search history.

(56) References Cited

U.S. PATENT DOCUMENTS

| | | |
|---|---|---|
| 529,535 A | 11/1894 | Smith |
| 529,538 A | 11/1894 | Vaughan |
| 1,942,770 A | 1/1934 | Peffer et al. |
| 2,526,033 A | 10/1950 | Lyon |
| 2,817,875 A | 12/1957 | Harris et al. |
| 2,902,388 A | 9/1959 | Szukiewicz |
| 2,983,693 A | 5/1961 | Sievers |
| 3,056,724 A | 10/1962 | Marston |
| 3,065,500 A | 11/1962 | Berner |
| 3,071,297 A | 1/1963 | Lee |
| 3,078,512 A | 2/1963 | De Haven |
| 3,223,027 A | 12/1965 | Soda et al. |
| 3,262,151 A | 7/1966 | Oxel |
| 3,269,961 A | 8/1966 | Bruson et al. |
| 3,308,218 A | 3/1967 | Wiegand et al. |
| 3,353,954 A | 11/1967 | Williams |

(Continued)

FOREIGN PATENT DOCUMENTS

| | | |
|---|---|---|
| AU | 23988/84 | 8/1984 |
| AU | 611478 | 6/1991 |

(Continued)

OTHER PUBLICATIONS

Kosmatka et al., 14th Ed., "Design and Control of Concrete Mixtures"—Chapter 3—http://www.ce.memphis.edu/1101/notes/concrete/PCA_manual/Chap03.pdf—Online Dec. 2, 2002.*

(Continued)

*Primary Examiner* — Ling Choi
*Assistant Examiner* — Ronald Grinsted
(74) *Attorney, Agent, or Firm* — Meunier Carlin & Curfman LLC

(57) ABSTRACT

Inorganic polymer/organic polymer composites and methods for their preparation are described herein. The inorganic polymer/organic polymer composites comprise a first layer comprising an inorganic polymer and a second layer adhered to the first layer comprising an organic polymer. The inorganic polymer is formed by reacting, in the presence of water, a reactive powder, an activator, and optionally a retardant. The reactive powder comprises 85% by weight or greater fly ash and less than 10% by weight portland cement. Also described herein are building materials including the composites.

19 Claims, No Drawings

(56) References Cited

U.S. PATENT DOCUMENTS

| | | |
|---|---|---|
| 3,466,705 A | 9/1969 | Richie |
| 3,497,367 A | 2/1970 | Gaskin et al. |
| 3,499,848 A | 3/1970 | Weisman |
| 3,528,126 A | 9/1970 | Ernst et al. |
| 3,566,448 A | 3/1971 | Ernst |
| 3,619,268 A | 11/1971 | Robertson et al. |
| 3,642,964 A | 2/1972 | Rausch et al. |
| 3,644,168 A | 2/1972 | Bonk et al. |
| 3,698,731 A | 10/1972 | Jost et al. |
| 3,726,624 A | 4/1973 | Schwarz |
| 3,736,081 A | 5/1973 | Yovanovich |
| 3,738,895 A | 6/1973 | Paymal |
| 3,764,247 A | 10/1973 | Garrett et al. |
| 3,768,937 A | 10/1973 | Haga et al. |
| 3,774,428 A | 11/1973 | Derry et al. |
| 3,802,582 A | 4/1974 | Brock |
| 3,816,043 A | 6/1974 | Snelling et al. |
| 3,819,574 A | 6/1974 | Brown et al. |
| 3,824,057 A | 7/1974 | Kornylak et al. |
| 3,830,776 A | 8/1974 | Carlson et al. |
| 3,832,429 A | 8/1974 | Charpentier et al. |
| 3,841,390 A | 10/1974 | DiBenedetto et al. |
| 3,843,757 A | 10/1974 | Ehrenfreund et al. |
| 3,852,387 A | 12/1974 | Bortnick et al. |
| 3,854,968 A | 12/1974 | Minnick et al. |
| 3,867,494 A | 2/1975 | Rood et al. |
| 3,878,027 A | 4/1975 | Troutner |
| 3,890,077 A | 6/1975 | Holman |
| 3,910,179 A | 10/1975 | Troutner |
| 3,917,547 A | 11/1975 | Massey |
| 3,917,774 A | 11/1975 | Sagane et al. |
| 3,928,258 A | 12/1975 | Alexander |
| 3,963,679 A | 6/1976 | Ullrich et al. |
| 3,981,654 A | 9/1976 | Rood et al. |
| 3,991,005 A | 11/1976 | Wallace |
| 3,999,230 A | 12/1976 | Bruning et al. |
| 3,999,320 A | 12/1976 | Zaubzer |
| 4,005,035 A | 1/1977 | Deaver |
| 4,038,238 A | 7/1977 | Cravens |
| 4,042,314 A | 8/1977 | Bruning et al. |
| 4,051,742 A | 10/1977 | Johansson et al. |
| 4,060,579 A | 11/1977 | Schmitzer et al. |
| 4,065,410 A | 12/1977 | Schäfer et al. |
| 4,073,840 A | 2/1978 | Saidla |
| 4,078,032 A | 3/1978 | Wenner |
| 4,088,804 A | 5/1978 | Cornwell et al. |
| 4,088,808 A | 5/1978 | Cornwell et al. |
| 4,092,276 A | 5/1978 | Narayan |
| 4,104,094 A | 8/1978 | Peterson |
| 4,107,248 A | 8/1978 | Schlieckmann |
| 4,120,626 A | 10/1978 | Keller |
| 4,127,040 A | 11/1978 | Moore et al. |
| 4,128,369 A | 12/1978 | Kemerer et al. |
| 4,131,474 A | 12/1978 | Uchikawa et al. |
| 4,137,200 A | 1/1979 | Wood et al. |
| 4,137,265 A | 1/1979 | Edwards et al. |
| 4,141,662 A | 2/1979 | Hepper et al. |
| 4,141,862 A | 2/1979 | Raden et al. |
| 4,143,759 A | 3/1979 | Paradis |
| 4,149,840 A | 4/1979 | Tippman |
| 4,153,766 A | 5/1979 | Koide et al. |
| 4,153,768 A | 5/1979 | Blount |
| 4,160,749 A | 7/1979 | Schneider et al. |
| 4,160,853 A | 7/1979 | Ammons |
| 4,163,824 A | 8/1979 | Saidla |
| 4,164,439 A | 8/1979 | Coonrod |
| 4,164,526 A | 8/1979 | Clay et al. |
| 4,165,414 A | 8/1979 | Narayan et al. |
| 4,177,232 A | 12/1979 | Day |
| 4,180,538 A | 12/1979 | Morikawa et al. |
| 4,190,454 A | 2/1980 | Yamagisi et al. |
| 4,200,699 A | 4/1980 | Treadwell |
| 4,209,605 A | 6/1980 | Hoy et al. |
| 4,210,572 A | 7/1980 | Herman et al. |
| 4,214,864 A | 7/1980 | Tabler |
| 4,221,877 A | 9/1980 | Cuscurida et al. |
| 4,240,950 A | 12/1980 | Von Bonin et al. |
| 4,241,131 A | 12/1980 | Bailey |
| 4,243,755 A | 1/1981 | Marx et al. |
| 4,247,656 A | 1/1981 | Janssen |
| 4,248,957 A | 2/1981 | Sander et al. |
| 4,248,975 A | 2/1981 | Satterly |
| 4,251,428 A | 2/1981 | Recker et al. |
| 4,254,002 A | 3/1981 | Sperling et al. |
| 4,254,176 A | 3/1981 | Müller et al. |
| 4,256,500 A | 3/1981 | Turpin, Jr. |
| 4,256,504 A | 3/1981 | Dunstan, Jr. |
| 4,256,846 A | 3/1981 | Ohashi et al. |
| 4,260,538 A | 4/1981 | Iseler et al. |
| 4,261,946 A | 4/1981 | Goyert et al. |
| 4,272,377 A | 6/1981 | Gerlach et al. |
| 4,275,033 A | 6/1981 | Schulte et al. |
| 4,276,337 A | 6/1981 | Coonrod |
| 4,278,468 A | 7/1981 | Selbe et al. |
| 4,282,988 A | 8/1981 | Hulbert, Jr. |
| 4,284,826 A | 8/1981 | Aelony |
| 4,290,248 A | 9/1981 | Kemerer et al. |
| 4,300,776 A | 11/1981 | Taubenmann |
| 4,313,763 A | 2/1982 | Turpin, Jr. |
| 4,330,494 A | 5/1982 | Iwata et al. |
| 4,330,634 A | 5/1982 | Rodaway |
| 4,331,726 A | 5/1982 | Cleary |
| 4,338,422 A | 7/1982 | Jackson, Jr. et al. |
| 4,339,366 A | 7/1982 | Blount |
| 4,342,847 A | 8/1982 | Goyert et al. |
| 4,344,873 A | 8/1982 | Wick |
| 4,347,281 A | 8/1982 | Futcher et al. |
| 4,350,533 A | 9/1982 | Galer et al. |
| 4,357,166 A | 11/1982 | Babcock |
| 4,359,359 A | 11/1982 | Gerlach et al. |
| 4,359,548 A | 11/1982 | Blount |
| 4,366,204 A | 12/1982 | Briggs |
| 4,367,259 A | 1/1983 | Fulmer et al. |
| 4,376,171 A | 3/1983 | Blount |
| 4,378,171 A | 3/1983 | Schmidt |
| 4,381,352 A | 4/1983 | McBrayer |
| 4,382,056 A | 5/1983 | Coonrod |
| 4,383,818 A | 5/1983 | Swannell |
| 4,390,581 A | 6/1983 | Cogswell et al. |
| 4,395,214 A | 7/1983 | Phipps et al. |
| 4,396,791 A | 8/1983 | Mazzoni |
| 4,397,983 A | 8/1983 | Hill et al. |
| 4,412,033 A | 10/1983 | LaBelle et al. |
| 4,421,871 A | 12/1983 | Korczak et al. |
| 4,439,548 A | 3/1984 | Weisman |
| 4,440,800 A | 4/1984 | Morton et al. |
| 4,450,133 A | 5/1984 | Cafarelli |
| 4,460,737 A | 7/1984 | Evans et al. |
| 4,465,500 A | 8/1984 | Motsinger et al. |
| 4,483,727 A | 11/1984 | Eickman et al. |
| 4,488,909 A | 12/1984 | Galer et al. |
| 4,489,023 A | 12/1984 | Proksa |
| 4,494,990 A | 1/1985 | Harris |
| 4,512,942 A | 4/1985 | Babbin et al. |
| 4,514,162 A | 4/1985 | Schulz |
| 4,521,428 A | 6/1985 | Nisato et al. |
| 4,532,098 A | 7/1985 | Campbell et al. |
| 4,540,357 A | 9/1985 | Campbell et al. |
| 4,546,120 A | 10/1985 | Peerman et al. |
| 4,568,702 A | 2/1986 | Mascioli |
| 4,576,718 A | 3/1986 | Reischl et al. |
| 4,581,186 A | 4/1986 | Larson |
| 4,595,709 A | 6/1986 | Reischl |
| 4,597,927 A | 7/1986 | Zeitler et al. |
| 4,600,311 A | 7/1986 | Mourrier et al. |
| 4,604,410 A | 8/1986 | Altenberg |
| 4,640,715 A | 2/1987 | Heitzmann et al. |
| 4,642,137 A | 2/1987 | Heitzmann et al. |
| 4,649,162 A | 3/1987 | Roche et al. |
| 4,661,533 A | 4/1987 | Stobby |
| 4,667,157 A | 5/1987 | Ciammaichella et al. |
| 4,677,157 A | 6/1987 | Jacobs |
| 4,680,214 A | 7/1987 | Frisch et al. |
| 4,714,778 A | 12/1987 | Burgoyne, Jr. et al. |

(56) References Cited

U.S. PATENT DOCUMENTS

| | | |
|---|---|---|
| 4,717,027 A | 1/1988 | Laure et al. |
| 4,728,287 A | 3/1988 | Niems |
| 4,728,288 A | 3/1988 | Niems |
| 4,737,524 A | 4/1988 | Ako et al. |
| 4,741,782 A | 5/1988 | Styron |
| 4,757,095 A | 7/1988 | Galan et al. |
| 4,758,602 A | 7/1988 | Trowell |
| 4,780,484 A | 10/1988 | Schubert et al. |
| 4,780,498 A | 10/1988 | Goerrissen et al. |
| 4,795,763 A | 1/1989 | Gluck et al. |
| 4,802,769 A | 2/1989 | Tanaka |
| 4,823,195 A | 4/1989 | Ito |
| 4,826,429 A | 5/1989 | Niems |
| 4,826,944 A | 5/1989 | Hoefer et al. |
| 4,832,183 A | 5/1989 | Hoefer et al. |
| 4,835,195 A | 5/1989 | Rayfield et al. |
| 4,842,649 A | 6/1989 | Heitzmann et al. |
| 4,855,184 A | 8/1989 | CloseKlun et al. |
| 4,892,586 A | 1/1990 | Watanabe et al. |
| 4,892,891 A | 1/1990 | Close |
| 4,895,352 A | 1/1990 | Stump |
| 4,933,013 A | 6/1990 | Sakai et al. |
| 4,948,859 A | 8/1990 | Echols et al. |
| 4,995,801 A | 2/1991 | Hehl |
| 4,997,484 A | 3/1991 | Gravitt et al. |
| 5,001,165 A | 3/1991 | Canaday et al. |
| 5,010,112 A | 4/1991 | Glicksman et al. |
| 5,028,648 A | 7/1991 | Famili et al. |
| 5,033,860 A | 7/1991 | Nakamura |
| 5,047,495 A | 9/1991 | Kolycheck |
| 5,051,222 A | 9/1991 | Marten et al. |
| 5,053,274 A | 10/1991 | Jonas |
| 5,064,293 A | 11/1991 | Nakamura |
| 5,075,417 A | 12/1991 | Trowell et al. |
| 5,091,436 A | 2/1992 | Frisch et al. |
| 5,094,798 A | 3/1992 | Hewitt |
| 5,096,993 A | 3/1992 | Smith et al. |
| 5,102,918 A | 4/1992 | Moriya |
| 5,102,969 A | 4/1992 | Scheffler et al. |
| 5,106,422 A | 4/1992 | Bennett et al. |
| 5,108,679 A | 4/1992 | Rirsch et al. |
| 5,114,630 A | 5/1992 | Newman et al. |
| 5,128,379 A | 7/1992 | Stone |
| 5,149,722 A | 9/1992 | Soukup |
| 5,149,739 A | 9/1992 | Lee |
| 5,159,012 A | 10/1992 | Doesburg et al. |
| 5,166,301 A | 11/1992 | Jacobs |
| 5,167,899 A | 12/1992 | Jezic |
| 5,177,444 A | 1/1993 | Cutmore |
| 5,185,420 A | 2/1993 | Smith et al. |
| 5,186,539 A | 2/1993 | Manser et al. |
| 5,188,064 A | 2/1993 | House |
| 5,192,366 A | 3/1993 | Nishioka et al. |
| 5,207,830 A | 5/1993 | Cowan et al. |
| 5,229,138 A | 7/1993 | Carotti |
| 5,252,697 A | 10/1993 | Jacobs et al. |
| 5,271,699 A | 12/1993 | Barre et al. |
| 5,278,195 A | 1/1994 | Volkert et al. |
| 5,295,545 A | 3/1994 | Passamaneck |
| 5,296,545 A | 3/1994 | Heise |
| 5,296,546 A | 3/1994 | Kishida et al. |
| 5,300,531 A | 4/1994 | Weaver |
| 5,302,634 A | 4/1994 | Mushovic |
| 5,309,690 A | 5/1994 | Symons |
| 5,330,341 A | 7/1994 | Kemerer et al. |
| 5,331,044 A | 7/1994 | Lausberg et al. |
| 5,337,824 A | 8/1994 | Cowan |
| 5,340,300 A | 8/1994 | Saeki et al. |
| 5,344,490 A | 9/1994 | Roosen et al. |
| 5,361,945 A | 11/1994 | Johanson |
| 5,366,547 A | 11/1994 | Brabston et al. |
| 5,368,997 A | 11/1994 | Kawamoto |
| 5,369,147 A | 11/1994 | Mushovic |
| 5,369,369 A | 11/1994 | Cutmore |
| 5,372,640 A | 12/1994 | Schwarz et al. |
| 5,374,308 A | 12/1994 | Kirkpatrick et al. |
| 5,375,988 A | 12/1994 | Klahre |
| 5,383,521 A | 1/1995 | Onan et al. |
| 5,387,283 A | 2/1995 | Kirkpatrick et al. |
| 5,401,785 A | 3/1995 | Kumagai et al. |
| 5,424,013 A | 6/1995 | Lieberman |
| 5,424,014 A | 6/1995 | Glorioso et al. |
| 5,432,204 A | 7/1995 | Farkas |
| 5,435,843 A | 7/1995 | Roy et al. |
| 5,439,518 A | 8/1995 | Francis et al. |
| 5,439,711 A | 8/1995 | Vu et al. |
| 5,451,615 A | 9/1995 | Birch |
| 5,453,231 A | 9/1995 | Douglas |
| 5,453,310 A | 9/1995 | Andersen et al. |
| 5,455,312 A | 10/1995 | Heidingsfeld et al. |
| 5,458,477 A | 10/1995 | Kemerer et al. |
| 5,484,480 A | 1/1996 | Styron |
| 5,489,334 A | 2/1996 | Kirkpatrick et al. |
| 5,489,646 A | 2/1996 | Tatman et al. |
| 5,490,889 A | 2/1996 | Kirkpatrick et al. |
| 5,491,174 A | 2/1996 | Grier et al. |
| 5,495,640 A | 3/1996 | Mullet et al. |
| 5,505,599 A | 4/1996 | Kemerer et al. |
| 5,508,315 A | 4/1996 | Mushovic |
| 5,512,319 A | 4/1996 | Cook et al. |
| 5,514,430 A | 5/1996 | Andersen et al. |
| 5,522,446 A | 6/1996 | Mullet et al. |
| 5,522,986 A | 6/1996 | Shi et al. |
| 5,527,172 A | 6/1996 | Graham, Jr. |
| 5,532,065 A | 7/1996 | Gubitz et al. |
| 5,536,310 A | 7/1996 | Brook et al. |
| 5,536,781 A | 7/1996 | Heidingsfeld et al. |
| 5,545,297 A | 8/1996 | Andersen et al. |
| 5,554,713 A | 9/1996 | Freeland |
| 5,556,458 A | 9/1996 | Brook et al. |
| 5,562,141 A | 10/1996 | Mullet et al. |
| 5,565,497 A | 10/1996 | Godbey et al. |
| 5,566,740 A | 10/1996 | Mullet et al. |
| 5,567,791 A | 10/1996 | Br auer et al. |
| 5,568,895 A | 10/1996 | Webb et al. |
| 5,569,713 A | 10/1996 | Lieberman |
| 5,582,840 A | 12/1996 | Pauw et al. |
| 5,582,849 A | 12/1996 | Lupke |
| 5,601,643 A | 2/1997 | Silverstrim et al. |
| 5,604,266 A | 2/1997 | Mushovic |
| 5,611,976 A | 3/1997 | Klier et al. |
| 5,621,024 A | 4/1997 | Eberhardt et al. |
| 5,624,489 A | 4/1997 | Fu et al. |
| 5,624,491 A | 4/1997 | Liskowitz et al. |
| 5,631,103 A | 5/1997 | Eschbach et al. |
| 5,631,319 A | 5/1997 | Reese et al. |
| 5,634,953 A | 6/1997 | Wissmann |
| 5,634,972 A | 6/1997 | Pacanovsky et al. |
| 5,643,516 A | 7/1997 | Raza et al. |
| 5,681,384 A | 10/1997 | Liskowitz et al. |
| 5,681,915 A | 10/1997 | Lechner et al. |
| 5,688,890 A | 11/1997 | Ishiguro et al. |
| 5,693,137 A | 12/1997 | Styron |
| 5,696,205 A | 12/1997 | Muller et al. |
| 5,700,495 A | 12/1997 | Kemerer et al. |
| 5,704,972 A | 1/1998 | Ivkovich |
| 5,710,231 A | 1/1998 | Fogg et al. |
| 5,714,002 A | 2/1998 | Styron |
| 5,714,003 A | 2/1998 | Styron |
| 5,718,757 A | 2/1998 | Guillou et al. |
| 5,718,857 A | 2/1998 | Howlett |
| 5,721,299 A | 2/1998 | DeVilbiss |
| 5,723,506 A | 3/1998 | Glorioso et al. |
| 5,728,209 A | 3/1998 | Bury et al. |
| 5,728,337 A | 3/1998 | Yoshikawa et al. |
| 5,759,695 A | 6/1998 | Primeaux, II |
| 5,760,133 A | 6/1998 | Heidingsfeld et al. |
| 5,769,281 A | 6/1998 | Bates |
| 5,770,416 A | 6/1998 | Lihme et al. |
| 5,772,752 A | 6/1998 | Liskowitz et al. |
| 5,782,283 A | 7/1998 | Kendall |
| 5,783,125 A | 7/1998 | Bastone et al. |
| 5,783,629 A | 7/1998 | Srinivasan et al. |
| 5,791,085 A | 8/1998 | Szmidt et al. |

(56) References Cited

U.S. PATENT DOCUMENTS

| | | |
|---|---|---|
| 5,795,949 A | 8/1998 | Daute et al. |
| 5,798,533 A | 8/1998 | Fishback et al. |
| 5,811,506 A | 9/1998 | Slagel |
| 5,817,402 A | 10/1998 | Miyake et al. |
| 5,820,668 A | 10/1998 | Comrie |
| 5,836,499 A | 11/1998 | Mullet et al. |
| 5,844,015 A | 12/1998 | Steilen et al. |
| 5,853,475 A | 12/1998 | Liskowitz et al. |
| 5,862,144 A | 1/1999 | Lee et al. |
| 5,908,573 A | 6/1999 | Chiles et al. |
| 5,908,701 A | 6/1999 | Jennings et al. |
| 5,929,153 A | 7/1999 | Mori et al. |
| 5,934,352 A | 8/1999 | Morgan |
| 5,945,460 A | 8/1999 | Ekart et al. |
| 5,952,053 A | 9/1999 | Colby |
| 5,962,144 A | 10/1999 | Primeaux, II |
| 5,965,117 A | 10/1999 | Howard, Jr. et al. |
| 5,976,240 A | 11/1999 | Vezza |
| 5,981,655 A | 11/1999 | Heidingsfeld et al. |
| 5,997,632 A | 12/1999 | Styron |
| 6,000,102 A | 12/1999 | Lychou |
| 6,007,618 A | 12/1999 | Norris et al. |
| 6,008,275 A | 12/1999 | Moreau et al. |
| 6,019,269 A | 2/2000 | Mullet et al. |
| 6,020,387 A | 2/2000 | Downey et al. |
| 6,040,381 A | 3/2000 | Jennings et al. |
| 6,044,512 A | 4/2000 | Hornby et al. |
| 6,051,634 A | 4/2000 | Laas et al. |
| 6,055,781 A | 5/2000 | Johanson |
| 6,060,531 A | 5/2000 | Horn et al. |
| 6,062,719 A | 5/2000 | Busby et al. |
| 6,086,802 A | 7/2000 | Levera et al. |
| 6,096,401 A | 8/2000 | Jenkines |
| 6,103,340 A | 8/2000 | Kubo et al. |
| 6,107,355 A | 8/2000 | Horn et al. |
| 6,107,433 A | 8/2000 | Petrovic et al. |
| 6,120,905 A | 9/2000 | Figovsky |
| 6,136,246 A | 10/2000 | Rauwendaal et al. |
| 6,136,870 A | 10/2000 | Triolo et al. |
| 6,140,381 A | 10/2000 | Rosthauser et al. |
| 6,143,069 A | 11/2000 | Brothers et al. |
| 6,153,673 A | 11/2000 | Lemos et al. |
| 6,166,109 A | 12/2000 | Spitler et al. |
| 6,177,232 B1 | 1/2001 | Melisaris et al. |
| 6,180,192 B1 | 1/2001 | Smith et al. |
| 6,180,686 B1 | 1/2001 | Kurth |
| RE37,095 E | 3/2001 | Glorioso et al. |
| 6,204,312 B1 | 3/2001 | Taylor |
| 6,211,259 B1 | 4/2001 | Borden et al. |
| 6,220,745 B1 | 4/2001 | Kobayashi et al. |
| 6,224,797 B1 | 5/2001 | Franzen et al. |
| 6,234,777 B1 | 5/2001 | Sperry et al. |
| 6,241,815 B1 | 6/2001 | Bonen |
| 6,251,178 B1 | 6/2001 | Styron |
| 6,252,031 B1 | 6/2001 | Tsutsumi et al. |
| 6,257,643 B1 | 7/2001 | Young |
| 6,257,644 B1 | 7/2001 | Young |
| 6,258,310 B1 | 7/2001 | Sardanopoli et al. |
| 6,258,917 B1 | 7/2001 | Slagel |
| 6,264,462 B1 | 7/2001 | Gallagher |
| 6,264,740 B1 | 7/2001 | McNulty, Jr. |
| 6,271,276 B1 | 8/2001 | Gribble et al. |
| 6,284,841 B1 | 9/2001 | Friesner |
| 6,287,550 B1 | 9/2001 | Trinh et al. |
| 6,294,637 B1 | 9/2001 | Braüer et al. |
| 6,297,321 B1 | 10/2001 | Onder et al. |
| 6,309,507 B1 | 10/2001 | Morikawa et al. |
| 6,312,244 B1 | 11/2001 | Levera et al. |
| 6,321,904 B1 | 11/2001 | Mitchell |
| 6,329,448 B1 | 12/2001 | Gutsche et al. |
| 6,331,577 B1 | 12/2001 | Volkert et al. |
| 6,343,924 B1 | 2/2002 | Klepsch |
| 6,346,146 B1 | 2/2002 | Duselis et al. |
| 6,348,514 B1 | 2/2002 | Calabrese et al. |
| 6,362,252 B1 | 3/2002 | Prutkin |
| 6,383,599 B1 | 5/2002 | Bell et al. |
| 6,387,504 B1 | 5/2002 | Mushovic |
| 6,409,949 B1 | 6/2002 | Tanaka et al. |
| 6,422,926 B1 | 7/2002 | McLain et al. |
| 6,429,257 B1 | 8/2002 | Buxton et al. |
| 6,432,335 B1 | 8/2002 | Ladang et al. |
| 6,433,032 B1 | 8/2002 | Hamilton |
| 6,433,121 B1 | 8/2002 | Petrovic et al. |
| 6,443,258 B1 | 9/2002 | Putt et al. |
| 6,455,605 B1 | 9/2002 | Giorgini et al. |
| 6,455,606 B1 | 9/2002 | Kaku et al. |
| 6,458,866 B1 | 10/2002 | Oppermann et al. |
| 6,465,569 B1 | 10/2002 | Kurth |
| 6,467,610 B1 | 10/2002 | MacLachlan |
| 6,469,667 B2 | 10/2002 | Fox et al. |
| 6,482,258 B2 | 11/2002 | Styron |
| 6,485,665 B1 | 11/2002 | Hermanutz et al. |
| 6,486,095 B1 | 11/2002 | Fujita et al. |
| 6,486,224 B2 | 11/2002 | Lin et al. |
| 6,495,772 B2 | 12/2002 | Anstrom et al. |
| 6,502,636 B2 | 1/2003 | Chatterji et al. |
| 6,534,617 B1 | 3/2003 | Batt et al. |
| 6,541,534 B2 | 4/2003 | Allen et al. |
| 6,552,660 B1 | 4/2003 | Lisowski |
| 6,554,894 B2 | 4/2003 | Styron et al. |
| 6,555,199 B1 | 4/2003 | Jenkines |
| 6,571,935 B1 | 6/2003 | Campbell et al. |
| 6,572,698 B1 | 6/2003 | Ko |
| 6,573,309 B1 | 6/2003 | Reitenbach et al. |
| 6,573,354 B1 | 6/2003 | Petrovic et al. |
| 6,578,619 B2 | 6/2003 | Wright |
| 6,579,932 B1 | 6/2003 | Schipper et al. |
| 6,586,490 B1 | 7/2003 | Dietrich et al. |
| 6,604,848 B2 | 8/2003 | Tanaka et al. |
| 6,605,343 B1 | 8/2003 | Motoi et al. |
| 6,609,638 B1 | 8/2003 | Lott |
| 6,613,823 B1 | 9/2003 | Battiste et al. |
| 6,613,827 B2 | 9/2003 | Lundgard et al. |
| 6,616,886 B2 | 9/2003 | Peterson et al. |
| 6,617,009 B1 | 9/2003 | Chen et al. |
| 6,620,487 B1 | 9/2003 | Tonyan et al. |
| 6,624,244 B2 | 9/2003 | Kurth |
| 6,629,413 B1 | 10/2003 | Wendt et al. |
| 6,641,384 B2 | 11/2003 | Bosler et al. |
| 6,641,658 B1 | 11/2003 | Dubey |
| 6,649,084 B2 | 11/2003 | Morikawa et al. |
| 6,649,667 B2 | 11/2003 | Clatty |
| 6,676,744 B2 | 1/2004 | Merkley et al. |
| 6,676,745 B2 | 1/2004 | Merkley et al. |
| 6,686,435 B1 | 2/2004 | Petrovic et al. |
| 6,695,902 B2 | 2/2004 | Hemmings et al. |
| 6,703,350 B2 | 3/2004 | Fujita et al. |
| 6,706,774 B2 | 3/2004 | Munzenberger et al. |
| 6,740,155 B1 | 5/2004 | Boggs et al. |
| 6,767,399 B2 | 7/2004 | Peev et al. |
| 6,769,220 B2 | 8/2004 | Friesner |
| 6,773,500 B1 | 8/2004 | Creamer et al. |
| 6,783,799 B1 | 8/2004 | Goodson |
| 6,786,966 B1 | 9/2004 | Johnson et al. |
| 6,797,674 B2 | 9/2004 | Kato et al. |
| 6,797,676 B2 | 9/2004 | Von Krosigk |
| 6,802,898 B1 | 10/2004 | Liskowitz et al. |
| 6,803,033 B2 | 10/2004 | McGee et al. |
| 6,805,740 B2 | 10/2004 | Canac et al. |
| 6,817,251 B1 | 11/2004 | Sowerby et al. |
| 6,827,776 B1 | 12/2004 | Boggs et al. |
| 6,831,118 B2 | 12/2004 | Munzenberger |
| 6,832,430 B1 | 12/2004 | Ogawa et al. |
| 6,841,111 B2 | 1/2005 | Rickner et al. |
| 6,849,676 B1 | 2/2005 | Shibano et al. |
| 6,855,844 B1 | 2/2005 | Geiger et al. |
| 6,858,074 B2 | 2/2005 | Anderson et al. |
| 6,864,296 B2 | 3/2005 | Kurth |
| 6,867,239 B2 | 3/2005 | Kurth |
| 6,869,474 B2 | 3/2005 | Perez-Pena et al. |
| 6,871,457 B2 | 3/2005 | Quintero-Flores et al. |
| 6,881,490 B2 | 4/2005 | Blum et al. |
| 6,881,763 B2 | 4/2005 | Kurth |
| 6,903,156 B2 | 6/2005 | Müller et al. |

(56) References Cited

U.S. PATENT DOCUMENTS

| | | |
|---|---|---|
| 6,904,971 B2 | 6/2005 | Brothers et al. |
| 6,908,573 B2 | 6/2005 | Hossan |
| 6,916,863 B2 | 7/2005 | Hemmings et al. |
| 6,923,857 B2 | 8/2005 | Constantinou et al. |
| 6,958,365 B2 | 10/2005 | Dontula et al. |
| 6,962,636 B2 | 11/2005 | Kurth et al. |
| 6,971,495 B2 | 12/2005 | Hedrick et al. |
| 6,979,477 B2 | 12/2005 | Kurth et al. |
| 6,979,704 B1 | 12/2005 | Mayer et al. |
| 6,989,123 B2 | 1/2006 | Lee et al. |
| 6,997,346 B2 | 2/2006 | Landers et al. |
| 7,063,877 B2 | 6/2006 | Kurth et al. |
| 7,101,430 B1 | 9/2006 | Pike et al. |
| 7,132,459 B1 | 11/2006 | Buchel |
| 7,160,976 B2 | 1/2007 | Lühmann et al. |
| 7,188,992 B2 | 3/2007 | Mattingly, Jr. |
| 7,196,124 B2 | 3/2007 | Parker et al. |
| 7,211,206 B2 | 5/2007 | Brown et al. |
| 7,219,733 B2 | 5/2007 | Luke et al. |
| 7,255,739 B2 | 8/2007 | Brothers et al. |
| 7,267,288 B2 | 9/2007 | Wheeler, Jr. et al. |
| 7,273,099 B2 | 9/2007 | East, Jr. et al. |
| 7,281,581 B2 | 10/2007 | Nguyen et al. |
| 7,288,148 B2 | 10/2007 | Hicks et al. |
| 7,294,193 B2 | 11/2007 | Comrie |
| 7,296,625 B2 | 11/2007 | East, Jr. |
| 7,316,559 B2 | 1/2008 | Taylor et al. |
| 7,316,659 B2 | 1/2008 | Lofberg |
| 7,318,473 B2 | 1/2008 | East, Jr. et al. |
| 7,325,608 B2 | 2/2008 | van Batenburg et al. |
| 7,334,635 B2 | 2/2008 | Nguyen |
| 7,344,592 B2 | 3/2008 | Setliff et al. |
| 7,347,896 B2 | 3/2008 | Harrison |
| 7,393,886 B2 | 7/2008 | Bandoh et al. |
| 7,442,248 B2 | 10/2008 | Timmons |
| 7,455,798 B2 | 11/2008 | Datta et al. |
| 7,459,421 B2 | 12/2008 | Bullis et al. |
| 7,462,236 B2 | 12/2008 | Chun et al. |
| 7,491,351 B2 | 2/2009 | Taylor et al. |
| 7,497,904 B2 | 3/2009 | Dulzer et al. |
| 7,572,485 B2 | 8/2009 | Sandor |
| 7,579,068 B2 | 8/2009 | Allen et al. |
| 7,651,564 B2 | 1/2010 | Francis |
| 7,651,645 B2 | 1/2010 | Taylor |
| 7,670,427 B2 | 3/2010 | Perez-Pena et al. |
| 7,691,198 B2 | 4/2010 | Van Deventer et al. |
| 7,708,825 B2 | 5/2010 | Sun et al. |
| 7,727,327 B2 | 6/2010 | Glessner et al. |
| 7,727,330 B2 | 6/2010 | Ordonez et al. |
| 7,732,032 B2 | 6/2010 | Dubey |
| 7,763,341 B2 | 7/2010 | Brown |
| 7,771,686 B2 | 8/2010 | Sagoe-Crentsil et al. |
| 7,776,934 B2 | 8/2010 | Lekovic et al. |
| 7,794,224 B2 | 9/2010 | Butteriss |
| 7,794,537 B2 | 9/2010 | Barlet-Gouedard et al. |
| 7,794,817 B2 | 9/2010 | Brown |
| 7,799,128 B2 | 9/2010 | Guynn et al. |
| 7,837,787 B2 | 11/2010 | De La Roij |
| 7,846,250 B2 | 12/2010 | Barlet-Gouedard et al. |
| 7,854,803 B1 | 12/2010 | Kirkpatrick et al. |
| 7,863,224 B2 | 1/2011 | Keys et al. |
| 7,878,026 B2 | 2/2011 | Datta et al. |
| 7,879,144 B2 | 2/2011 | Hemmings et al. |
| 7,883,576 B2 | 2/2011 | Comrie |
| 7,892,351 B1 | 2/2011 | Kirkpatrick et al. |
| 7,897,648 B2 | 3/2011 | Halimaton |
| 8,002,889 B2 | 8/2011 | Drochon et al. |
| 8,007,584 B2 | 8/2011 | Garuti, Jr. et al. |
| 8,016,937 B2 | 9/2011 | Schumacher et al. |
| 8,016,960 B2 | 9/2011 | Wittbold et al. |
| 8,024,818 B1 | 9/2011 | Davenport |
| 8,030,364 B2 | 10/2011 | Kim et al. |
| 8,030,377 B2 | 10/2011 | Dubey et al. |
| 8,038,789 B2 | 10/2011 | Boxley |
| 8,038,790 B1 | 10/2011 | Dubey et al. |
| 8,053,498 B2 | 11/2011 | Wieland et al. |
| 8,057,594 B2 | 11/2011 | Doyoyo et al. |
| 8,057,915 B2 | 11/2011 | Song et al. |
| 8,061,257 B2 | 11/2011 | Tonyan et al. |
| 8,070,878 B2 | 12/2011 | Dubey |
| 8,079,198 B2 | 12/2011 | Tonyan et al. |
| 8,088,217 B2 | 1/2012 | Francis |
| 8,088,218 B2 | 1/2012 | Blackburn et al. |
| 8,092,593 B2 | 1/2012 | McCombs |
| 8,093,315 B2 | 1/2012 | Bell et al. |
| 8,114,267 B2 | 2/2012 | Nordlinder |
| 8,122,679 B2 | 2/2012 | Tonyan et al. |
| 8,127,849 B2 | 3/2012 | Gupta |
| 8,129,461 B2 | 3/2012 | Xenopoulos et al. |
| 8,133,352 B2 | 3/2012 | Merkley et al. |
| 8,167,994 B2 | 5/2012 | Birch |
| 8,172,940 B2 | 5/2012 | Boxley et al. |
| 8,177,909 B2 | 5/2012 | Constantz et al. |
| 8,186,106 B2 | 5/2012 | Schumacher et al. |
| 8,227,656 B2 | 7/2012 | Svetlik |
| 8,313,802 B2 | 11/2012 | Riman et al. |
| 8,846,776 B2 | 9/2014 | Herrington et al. |
| 8,889,754 B2 | 11/2014 | Rodrigo et al. |
| 8,931,230 B2 | 1/2015 | Negri et al. |
| 2001/0009683 A1 | 7/2001 | Kitahama et al. |
| 2002/0017224 A1 | 2/2002 | Horton |
| 2002/0034598 A1 | 3/2002 | Bonk et al. |
| 2002/0040071 A1 | 4/2002 | Lin et al. |
| 2002/0045048 A1 | 4/2002 | Bonk et al. |
| 2002/0048643 A1 | 4/2002 | Bonk et al. |
| 2002/0086913 A1 | 7/2002 | Roels et al. |
| 2002/0098362 A1 | 7/2002 | Mushovic |
| 2002/0119300 A1 | 8/2002 | Taylor |
| 2002/0122929 A1 | 9/2002 | Simpson et al. |
| 2002/0171164 A1 | 11/2002 | Halterbaum et al. |
| 2002/0192456 A1 | 12/2002 | Mashburn et al. |
| 2003/0004232 A1 | 1/2003 | Ruede |
| 2003/0021915 A1 | 1/2003 | Rohatgi et al. |
| 2003/0041785 A1 | 3/2003 | Harrison |
| 2003/0047836 A1 | 3/2003 | Rickner et al. |
| 2003/0056696 A1 | 3/2003 | Fenske et al. |
| 2003/0065045 A1 | 4/2003 | Falke et al. |
| 2003/0083394 A1 | 5/2003 | Clatty |
| 2003/0090016 A1 | 5/2003 | Petrovic et al. |
| 2003/0127025 A1 | 7/2003 | Orange et al. |
| 2003/0143910 A1 | 7/2003 | Mashburn et al. |
| 2003/0158365 A1 | 8/2003 | Brauer et al. |
| 2003/0166735 A1 | 9/2003 | Clatty |
| 2003/0204016 A1 | 10/2003 | Arntz et al. |
| 2003/0232933 A1 | 12/2003 | Lagneaux et al. |
| 2004/0014830 A1 | 1/2004 | Wiese et al. |
| 2004/0048055 A1 | 3/2004 | Branca |
| 2004/0049002 A1 | 3/2004 | Andrews et al. |
| 2004/0121161 A1 | 6/2004 | Shugert et al. |
| 2004/0144287 A1 | 7/2004 | Tardif et al. |
| 2004/0149174 A1 | 8/2004 | Farrington et al. |
| 2004/0162360 A1 | 8/2004 | Kiso et al. |
| 2004/0176486 A1 | 9/2004 | Glorioso et al. |
| 2004/0198900 A1 | 10/2004 | Madaj |
| 2004/0247857 A1 | 12/2004 | Schroeder et al. |
| 2004/0266993 A1 | 12/2004 | Evans |
| 2005/0005869 A1 | 1/2005 | Fritter et al. |
| 2005/0005870 A1 | 1/2005 | Fritter et al. |
| 2005/0011159 A1 | 1/2005 | Standal et al. |
| 2005/0013793 A1 | 1/2005 | Beckman et al. |
| 2005/0031578 A1 | 2/2005 | Deslauriers et al. |
| 2005/0032925 A1 | 2/2005 | Kaplan |
| 2005/0070620 A1 | 3/2005 | Herrington et al. |
| 2005/0075497 A1 | 4/2005 | Utz et al. |
| 2005/0079339 A1 | 4/2005 | Riddle |
| 2005/0118130 A1 | 6/2005 | Utz et al. |
| 2005/0129643 A1 | 6/2005 | Lepilleur et al. |
| 2005/0131092 A1 | 6/2005 | Kurth et al. |
| 2005/0131093 A1 | 6/2005 | Kurth et al. |
| 2005/0161855 A1 | 7/2005 | Brown |
| 2005/0163969 A1 | 7/2005 | Brown |
| 2005/0171243 A1 | 8/2005 | Hemmings et al. |
| 2005/0175577 A1 | 8/2005 | Jenkins et al. |
| 2005/0182228 A1 | 8/2005 | Kurth |

(56) References Cited

U.S. PATENT DOCUMENTS

| | | |
|---|---|---|
| 2005/0197413 A1 | 9/2005 | Grimm et al. |
| 2005/0197422 A1 | 9/2005 | Mayadunne et al. |
| 2005/0208167 A1 | 9/2005 | You et al. |
| 2005/0222303 A1 | 10/2005 | Cernohous |
| 2005/0260351 A1 | 11/2005 | Kurth et al. |
| 2005/0281999 A1 | 12/2005 | Hofmann et al. |
| 2005/0287238 A1 | 12/2005 | Taylor |
| 2006/0003042 A1 | 1/2006 | Inoue et al. |
| 2006/0008402 A1 | 1/2006 | Robles |
| 2006/0011159 A1 | 1/2006 | Bloms et al. |
| 2006/0014891 A1 | 1/2006 | Yang et al. |
| 2006/0041155 A1 | 2/2006 | Casper |
| 2006/0041156 A1 | 2/2006 | Casper et al. |
| 2006/0045899 A1 | 3/2006 | Sarangapani et al. |
| 2006/0071369 A1 | 4/2006 | Butteriss |
| 2006/0096166 A1 | 5/2006 | Brooks et al. |
| 2006/0105145 A1 | 5/2006 | Brown |
| 2006/0115625 A1 | 6/2006 | Brown |
| 2006/0131791 A1 | 6/2006 | Nakamura et al. |
| 2006/0144005 A1 | 7/2006 | Tonyan et al. |
| 2006/0186571 A1 | 8/2006 | Brown |
| 2006/0186572 A1 | 8/2006 | Brown |
| 2006/0201394 A1 | 9/2006 | Kulakofsky et al. |
| 2006/0201395 A1 | 9/2006 | Barger et al. |
| 2006/0217517 A1 | 9/2006 | Daly |
| 2006/0235100 A1 | 10/2006 | Kaushiva et al. |
| 2006/0243169 A1 | 11/2006 | Mak et al. |
| 2006/0270747 A1 | 11/2006 | Griggs |
| 2006/0273486 A1 | 12/2006 | Taylor et al. |
| 2006/0292358 A1 | 12/2006 | Robertson et al. |
| 2007/0022106 A1 | 1/2007 | Brandt et al. |
| 2007/0027227 A1 | 2/2007 | Shutov |
| 2007/0037953 A1 | 2/2007 | Geiger et al. |
| 2007/0039515 A1 | 2/2007 | Bandoh et al. |
| 2007/0052128 A1 | 3/2007 | Taylor |
| 2007/0053821 A1 | 3/2007 | Gillman et al. |
| 2007/0056875 A1 | 3/2007 | Hlady et al. |
| 2007/0066697 A1 | 3/2007 | Gilder et al. |
| 2007/0125272 A1 | 6/2007 | Johnson |
| 2007/0221100 A1 | 9/2007 | Kumar et al. |
| 2007/0222105 A1 | 9/2007 | Brown |
| 2007/0222106 A1 | 9/2007 | Brown |
| 2007/0225391 A1 | 9/2007 | Brown |
| 2007/0225419 A1 | 9/2007 | Brown |
| 2007/0261947 A1 | 11/2007 | Geerlings et al. |
| 2007/0294974 A1 | 12/2007 | Tonyan et al. |
| 2008/0022940 A1 | 1/2008 | Kirsch et al. |
| 2008/0029039 A1 | 2/2008 | Jenkins |
| 2008/0029925 A1 | 2/2008 | Brown |
| 2008/0119578 A1 | 5/2008 | Prince et al. |
| 2008/0132632 A1 | 6/2008 | Schiraldi et al. |
| 2008/0184939 A1 | 8/2008 | Fritter et al. |
| 2008/0196629 A1 | 8/2008 | Yamakawa et al. |
| 2008/0236450 A1 | 10/2008 | Bonafous et al. |
| 2008/0237914 A1 | 10/2008 | Lustiger et al. |
| 2008/0241458 A1 | 10/2008 | Jenkines |
| 2008/0251027 A1 | 10/2008 | Kirsch et al. |
| 2008/0271641 A1 | 11/2008 | Ko et al. |
| 2008/0289542 A1 | 11/2008 | Ko et al. |
| 2008/0308045 A1 | 12/2008 | Fritter et al. |
| 2008/0310247 A1 | 12/2008 | Basaraba |
| 2009/0007852 A1 | 1/2009 | Fritter et al. |
| 2009/0036573 A1 | 2/2009 | Mita et al. |
| 2009/0069117 A1 | 3/2009 | Kennedy et al. |
| 2009/0130452 A1 | 5/2009 | Surace et al. |
| 2009/0184058 A1 | 7/2009 | Douglas |
| 2009/0198036 A1 | 8/2009 | Duffy |
| 2009/0217844 A1 | 9/2009 | Ordonez et al. |
| 2009/0217882 A1 | 9/2009 | Jenkins |
| 2009/0255668 A1 | 10/2009 | Fleming et al. |
| 2009/0255677 A1 | 10/2009 | Bryant et al. |
| 2009/0295021 A1 | 12/2009 | Brown |
| 2009/0306251 A1 | 12/2009 | Francis |
| 2009/0318571 A1 | 12/2009 | Utz et al. |
| 2010/0025882 A1 | 2/2010 | Taylor et al. |
| 2010/0071597 A1* | 3/2010 | Perez-Pena .......... C04B 28/021 106/708 |
| 2010/0101457 A1 | 4/2010 | Surace et al. |
| 2010/0126350 A1 | 5/2010 | Sharma |
| 2010/0201014 A1 | 8/2010 | Taylor |
| 2010/0230852 A1 | 9/2010 | Brown |
| 2010/0242803 A1 | 9/2010 | Glessner, Jr. et al. |
| 2010/0247937 A1 | 9/2010 | Liu et al. |
| 2010/0264559 A1 | 10/2010 | Brown |
| 2010/0292397 A1 | 11/2010 | Brown |
| 2010/0296361 A1 | 11/2010 | Brown |
| 2011/0003904 A1 | 1/2011 | Guevara et al. |
| 2011/0028607 A1 | 2/2011 | Morgan et al. |
| 2011/0059319 A1 | 3/2011 | Raday |
| 2011/0073311 A1 | 3/2011 | Porcherie et al. |
| 2011/0086931 A1 | 4/2011 | Herrington et al. |
| 2011/0086933 A1 | 4/2011 | Herrington et al. |
| 2011/0086934 A1 | 4/2011 | Herrington et al. |
| 2011/0088598 A1 | 4/2011 | Lisowski et al. |
| 2011/0182799 A1 | 7/2011 | Riman et al. |
| 2011/0192100 A1 | 8/2011 | Tonyan et al. |
| 2011/0250440 A1 | 10/2011 | Goodson |
| 2011/0259245 A1 | 10/2011 | Sperisen et al. |
| 2011/0269875 A1 | 11/2011 | Nicoleau et al. |
| 2011/0271876 A1 | 11/2011 | Alter et al. |
| 2011/0283921 A1 | 11/2011 | Schumacher et al. |
| 2011/0283922 A1 | 11/2011 | Schumacher et al. |
| 2011/0284223 A1 | 11/2011 | Porcherie et al. |
| 2011/0287198 A1 | 11/2011 | Song et al. |
| 2011/0290153 A1 | 12/2011 | Abdullah et al. |
| 2011/0303156 A1 | 12/2011 | Sikka et al. |
| 2012/0024196 A1 | 2/2012 | Gong et al. |
| 2012/0024198 A1 | 2/2012 | Schwartzentruber et al. |
| 2012/0029145 A1 | 2/2012 | Brown |
| 2012/0037043 A1 | 2/2012 | Zubrod |
| 2012/0040165 A1 | 2/2012 | Dubey |
| 2012/0085264 A1 | 4/2012 | Zhang et al. |
| 2012/0111236 A1 | 5/2012 | Constantz et al. |
| 2012/0167804 A1 | 7/2012 | Perez-Pena |
| 2012/0172469 A1 | 7/2012 | Perez-Pena |
| 2012/0216952 A1 | 8/2012 | Bushendorf et al. |
| 2012/0312194 A1 | 12/2012 | Riman et al. |
| 2013/0059934 A1 | 3/2013 | Burgess et al. |
| 2013/0065980 A1 | 3/2013 | Yoshitomi |
| 2013/0072588 A1 | 3/2013 | Rosthauser et al. |
| 2013/0087076 A1 | 4/2013 | Hill et al. |
| 2013/0087077 A1 | 4/2013 | Hill et al. |
| 2013/0087078 A1 | 4/2013 | Hill et al. |
| 2013/0087079 A1 | 4/2013 | Hill et al. |
| 2013/0122267 A1 | 5/2013 | Riman et al. |
| 2013/0133554 A1 | 5/2013 | Lloyd et al. |
| 2013/0133555 A1 | 5/2013 | Lloyd et al. |
| 2013/0206040 A1 | 8/2013 | Zhang et al. |
| 2013/0284069 A1 | 10/2013 | Dubey |
| 2013/0284070 A1 | 10/2013 | Dubey |

FOREIGN PATENT DOCUMENTS

| | | |
|---|---|---|
| AU | 630892 | 11/1992 |
| AU | 738043 | 11/1997 |
| AU | 718757 | 4/2000 |
| AU | 200040871 | 9/2000 |
| AU | 2005202108 | 12/2005 |
| AU | 2005248952 | 12/2005 |
| AU | 2007200076 | 1/2007 |
| AU | 2007200162 | 10/2007 |
| AU | 2007347758 | 9/2008 |
| AU | 2007347756 | 1/2009 |
| CA | 2037130 | 1/2006 |
| CN | 1251596 | 4/2000 |
| CN | 1052991 | 5/2000 |
| CN | 1926282 | 3/2007 |
| CN | 101033642 | 9/2007 |
| DE | 2351844 | 4/1975 |
| DE | 9318515 | 2/1994 |
| EP | 115374 | 8/1984 |
| EP | 0654297 | 5/1995 |
| EP | 0771827 | 5/1997 |
| EP | 1336461 | 5/2002 |

(56) References Cited

FOREIGN PATENT DOCUMENTS

| | | |
|---|---|---|
| GB | 867328 | 5/1961 |
| GB | 1152306 | 5/1969 |
| GB | 1246940 | 9/1971 |
| GB | 1314707 | 4/1973 |
| GB | 1356641 | 6/1974 |
| GB | 1456641 | 11/1976 |
| GB | 2300627 | 11/1996 |
| GB | 2347933 | 9/2000 |
| GB | 2454990 | 5/2009 |
| JP | S54-47321 | 4/1979 |
| JP | S54-47321 A * | 4/1979 |
| JP | 355080456 | 6/1980 |
| JP | 58-132533 | 8/1983 |
| JP | 63-022819 | 1/1988 |
| JP | 63-202408 | 8/1988 |
| JP | 07-076395 | 3/1995 |
| JP | 07-313941 | 12/1995 |
| JP | 08-157638 | 6/1996 |
| JP | 08-188634 | 7/1996 |
| JP | 11-171960 | 6/1999 |
| JP | 2001-326361 | 11/2001 |
| JP | 2004091230 | 3/2004 |
| JP | 2004-131654 | 4/2004 |
| JP | 2005-138567 | 6/2005 |
| KR | 10-2001-0090026 | 10/2001 |
| KR | 2002-0086327 | 11/2002 |
| KR | 10-2007-0051111 | 5/2007 |
| NZ | 226301 | 3/1990 |
| WO | 81/03026 | 10/1981 |
| WO | 87/05541 | 9/1987 |
| WO | 8804285 | 6/1988 |
| WO | 91/00304 | 1/1991 |
| WO | 92/07892 | 5/1992 |
| WO | 93/19110 | 9/1993 |
| WO | 93/24549 | 12/1993 |
| WO | 94/25529 | 11/1994 |
| WO | 94/27697 | 12/1994 |
| WO | 97/11114 | 3/1997 |
| WO | 97/44373 | 11/1997 |
| WO | 98/08893 | 3/1998 |
| WO | 99/37592 | 1/1999 |
| WO | 99/39891 | 8/1999 |
| WO | 00/17249 | 3/2000 |
| WO | 00/40650 | 7/2000 |
| WO | 01/18087 | 3/2001 |
| WO | 01/72863 | 10/2001 |
| WO | 01/85140 | 11/2001 |
| WO | 02/01530 | 1/2002 |
| WO | 02/068490 | 9/2002 |
| WO | 2004/078900 | 9/2004 |
| WO | 2004/113248 | 12/2004 |
| WO | 2005/053938 | 6/2005 |
| WO | 2005/056267 | 6/2005 |
| WO | 2005/072187 | 8/2005 |
| WO | 2005/072188 | 8/2005 |
| WO | 2005/094255 | 10/2005 |
| WO | 2005/123798 | 12/2005 |
| WO | 2006/012149 | 2/2006 |
| WO | 2006/137672 | 12/2006 |
| WO | 2007/112104 | 10/2007 |
| WO | 2007/112105 | 10/2007 |
| WO | 2008089481 | 7/2008 |
| WO | 2008130107 | 10/2008 |
| WO | 2009005205 | 1/2009 |
| WO | 2010074811 | 7/2010 |
| WO | 2011019997 | 2/2011 |
| WO | 2011026723 | 3/2011 |
| WO | 2011038459 | 4/2011 |
| WO | 2011085365 | 7/2011 |
| WO | 2011096925 | 8/2011 |
| WO | 2012142547 | 10/2012 |
| WO | 2013/049401 | 4/2013 |
| WO | 2013066561 | 10/2013 |
| WO | 2013052732 | 11/2013 |
| WO | 2014168633 | 10/2014 |

OTHER PUBLICATIONS

Maury et al., "State of the art of TiO2 containing cementitious materials: self-cleaning properties", Materiales de Construccion, vol. 60, 298, 33-50, abril-junio 2010.*
JP 554-47321A—machine translation—Apr. 13, 1979.*
General Plastics—Low Density Polyurethane Foam, https://www.generalplastics.com/why-polyurethane.html.*
International Search Report issued on Feb. 26, 2013, in related International Application No. PCT/US2012/058852.
Davidovits, J., Geopolymer chemistry and applications, Chapter 22: Foamed Geopolymer, p. 471-478.
"Dry Cast vs. Wet Cast," Edward's Cast Stone Company. Feb. 12, 2010 [Retrieved on May 30, 2013]. Retrieved from http://web.archive.org/web/20100212132701/http://www.edwardscaststone.conn/products_drywet.cfm.
E. Revertegat, C. Richet, & P. Gégout, "Effect of pH on the Durability of Cement Pastes," Cement &Concrete Res., vol. 22: pp. 259-272 (1992).
"Effect of Mixing Time on Properties of Concrete." Technology Blog.Oct. 16, 2010 [Retrieved on May 31, 2013]. Retrieved from http://web.archive.org/web/20101016235150/http://civil-engg-world.blogspot.com/2008/12/effect-of-mixing-time-on-properties-of.html.
International Search Report and Written Opinion, mailed Feb. 15, 2013, in International Patent Application No. PCT/US2012/058847.
Non-Final Office Action mailed Nov. 2, 2012, in U.S. Appl. No. 13/268,011.
Advisory Action mailed Jul. 26, 2013, in U.S. Appl. No. 13/267,967.
Final Office Action mailed Apr. 5, 2013, in U.S. Appl. No. 13/267,967.
Non-Final Office Action mailed Nov. 2, 2013, in U.S. Appl. No. 13/267,967.
Non-Final Office Action mailed Oct. 30, 2013, in U.S. Appl. No. 13/307,504.
Non-Final Office Action mailed May 30, 2013, in U.S. Appl. No. 13/268,211.
Final Office Action mailed May 9, 2013, in U.S. Appl. No. 13/267,969.
Non-Final Office Action mailed Nov. 6, 2012, in U.S. Appl. No. 13/267,969.
Non-Final Office Action mailed Jan. 17, 2014, in U.S. Appl. No. 13/307,188.
Non-Final Office Acton mailed Dec. 6, 2013, in U.S. Appl. No. 13/646,060.
Non-Final Office Action mailed Feb. 12, 2014, in U.S. Appl. No. 13/269,283.
Final Office Action mailed Jun. 4, 2014, in U.S. Appl. No. 13/269,283.
International Preliminary Report on Patentability issued in International Application No. PCT/US2012/058847 on May 15, 2014.
International Preliminary Report on Patentability issued in International Application No. PCT/2012/058852 on Apr. 17, 2014.
Supplementary European Search Report for European Patent Application No. EP12838478.1, dated Jul. 15, 2015.
Anonymous. "Rigid polyurethane foams having a strut/window mass ratio in the range of 90/10 to 10/90, made via extrusion." Research Disclosure. Journal No. 40264, Published Oct. 1997.
Anonymous. "Cellular plastics made by extrusion." Research Disclosure. Journal No. 40204, Published Oct. 1997.
Bayer Material Science Product Information, Multranol 3900, Jan. 2006.
Bayer Material Science, Arcol LG-56-Polyether Polyol, CAS No. 25791-96-2, Product Code: KLLG56 (2003).
Bayer Material Science, Multranol 4035—Polyether Polyol, CAS No. 9049-71-2, Product Code: K114 (1997).
Bledzki, Andrzej K., et al., Impact Properties of Natural Fiber-Reinforced Epoxy Foams, Journal of Cellular Plastics, vol. 35, Nov. 1999, pp. 550-562.

(56) References Cited

OTHER PUBLICATIONS

Cayli et al., "Soybean Oil Based Isocyanates: Synthesis, Characterizations, and Polymerizations," Conference Abstract, 2nd Workshop on Fats and Oils as Renewable Feedstock for the Chemical Industry, Mar. 22-24, 2009.
Dolui, S.K., "Unusual effect of filler (CaCO3) on thermal degradation of polyurethane," Journal of Applied Polymer Science, 53(4): 463-465 (2003).
Guhanathan, S. et al., "Studies on Castor Oil-based Polyurethane/ Polyacrylonitrile Interpenetrating Polymer Network for Toughening of Unsaturated Polyester Resin," Journal of Applied Polymer Science, 92:817-829 (2004).
Guo et al., "Polyols and Polyurethanes from Hydroformylation of Soybean Oil," Journal of Polymers and the Environment 10(1-2):49-52 (Apr. 2002).
Guo et al., "Rigid Urethane Foams from a Soy Polyol-Dod Hybrid," USDA Agricultural Research Service, http://ars.usda.gov/research/publications/publications.htm?SEQ-NO-115=145249 (May 9, 2003).
Hojabri et al., "Fatty Acid-Derived Diisocyanate and Biobased Polyurethane Produced from Vegetable Oil: Synthesis, Polymerization, and Characterization," Biomacromolecules, 10(4):884-891 (2009), abstract.
Ionescu, "Chemistry and Technology of Polyols for Polyurethanes," Rapra Technology Ltd,. (2005), pp. 535-550.
Inukai et al., "Glass Fiber Reinforced Rigid Polyurethane Foam (Elson Neo-Lumber FFU)," International Progress in Urethanes, vol. 5, Lancaster, PA, Technomic Publishing Co., Inc., 1988.
Javni, I. et al., "Thermal Stability of Polyurethanes Based on Vegetable Oils," Journal of Applied Polymer Science, 77:1723-1734 (2000).
Klempner, D., ed., et al., Excerpts from Handbook of Polymeric Foams and Foam Technology, 2d ed., 2004, pp. 121-124, 126, 128, 129, Hanser Publishers, Munich.
Krishnamurthi, B, et al.., Nano- and Micro-Fillers for Polyurethane Foams: Effect on Density and Mechanical Properties, Symposium, Sep. 30-Oct. 3, 2001, pp. 239-244, Polyurethanes Expo 2001, Columbus, OH.
Morimoto et al., "Continuous Glass Fiber Reinforced Rigid Polyurethane Foam (Airlite FRU)," International Progress in Urethanes, vol. 5, Lancaster, PA, Technomic Publishing Co., Inc., 1988.

National Center for Environmental Research and Quality Assurance, Office of Research and Development, U.S. Environmental Protection Agency, Abstract of "The Use of Multi-Component Waste Products for Use in Roofing Materials," May 9, 1998.
Nayak, P.L., "Natural Oil-Based Polymers: Opportunities and Challenges," J. Macro. Sci. Rev. Macro. Chem. & Phys., C40(1):1-21 (2000).
Nosker, Thomas J., et al., Fiber Orientation and Creation of Structural Plastic Lumber, Plastics Engineering, Jun. 1999, pp. 53-56.
Oertel, G., ed., Polyurethane Handbook Second Edition, pp. 136, 182-183, 252-253; Carl Hanser, Verlag, Munich (1994).
Okagawa et al., "Glass Fiber Reinforced Rigid Polyurethane Foam," Cellular and non cellular polyurethanes, Carl Hanser Verlag Munchen Wien Druck and Bindung, Germany, p. 453-467, 1980.
Okagawa, F., "Glass Fiber Reinforced Rigid Polyurethane Foam", International Progress in Urethane, vol. 2, Lancaster, PA, Technomic Publishing Co., Inc., 1980.
OSi Specialties, "Fomrez Tin Catalysts", 3 pages.
Petrovic et al., "Industrial Oil Products Program," AOCS Archives, (2007).
Pollack, "Soy vs. Petro Polyols a Life-Cycle Comparison," Omni Tech International, Ltd. (2002).
Rama, Shetty R. et al., Journal of Reinforced Plastics and Composites, 2010, 29:2099-2104 (Abstract).
Randall, D., ed., et. al., Excerpts from "The polyurethanes book", 2002, pp. 1, 166-167, 210-213, 229-231, 263-264, Dunholm Publicity Ltd., United Kingdom.
Shutov, F.A., Excerpts from Integral/Structural Polymer Foams: Technology, Properties and Applications, 1986, pp. including preface, 3-4, 8-9, 13, 23-25, 131-134, 153-158, 167, 171, 176-179, 256.
Soya-based isocyanate alternatives coming? (US Newslines), Apr. 1, 2007.
Standard Practice for Polyurethane Raw Materials: Polyurethane Foam Cup Test, ASTM D7487-08, 2008.
Szycher, Michael. 17.7.1 Foam Production by Extruder Method. Szycher's Handbook of Polyurethanes. pp. 17-21-17-22. Copyright 1999 by CRC Press LLC.
Woods, G., Excerpts from "The ICI Polyurethanes Book", 1987, pp. 119-120, 127, 135-140, 158-159, The Netherlands.
Wypych, G., Excerpts from "Fillers", 1993, pp. 4, 48, 57, ChemTech Publishing, Ontario Canada.

* cited by examiner

INORGANIC POLYMER/ORGANIC POLYMER COMPOSITES AND METHODS OF MAKING SAME

CROSS-REFERENCE TO PRIORITY APPLICATIONS

This application claims benefit of priority to International Patent Application No. PCT/US2012/58852, filed Oct. 5, 2012, which claims the benefit of priority to U.S. Provisional Patent Application No. 61/544,474, filed Oct. 7, 2011, both of which are incorporated herein by reference in their entirety.

BACKGROUND

Certain building materials can be prepared from cementitious mixtures based on portland cement and can contain additives to enhance the properties of the materials. Fly ash is used in cementitious mixtures to provide enhanced durability and reduced permeability of the cementitious products. In addition to imparting improved performance properties, the use of fly ash is desirable because it is a recyclable product and would otherwise be a waste material. Furthermore, fly ash is less expensive than portland cement. Thus, there is a desire to provide high strength building products that are based on fly ash.

SUMMARY

Inorganic polymer/organic polymer composites and methods for their preparation are described. The inorganic polymer/organic polymer composites comprise a first layer comprising an inorganic polymer and a second layer adhered to the first layer comprising an organic polymer. The inorganic polymer is formed by reacting, in the presence of water, a reactive powder, an activator, and optionally a retardant. The reactive powder comprises fly ash and less than 10% by weight portland cement.

The fly ash can be present in an amount of greater than 85% by weight of the reactive powder (e.g., greater than 90% by weight or greater than 95% by weight). In some examples, the fly ash includes a calcium oxide content of from 18% to 35% by weight (e.g., from 23% to 30% by weight). The fly ash present in the reactive powder can include Class C fly ash. In some examples, greater than 75%, greater than 85%, or greater than 95% of the fly ash comprises Class C fly ash. The reactive powder can further include portland cement in an amount of less than 10% by weight. For example, the reactive powder can include less than 5% by weight, less than 3% by weight, or less than 1% by weight of portland cement.

In some embodiments, the activator used to prepare the inorganic polymers can include citric acid and/or sodium hydroxide. In some examples, the activator is present in an amount of from 1.5% to 8.5% based on the weight of the reactive powder. Optionally, a retardant (e.g., borax, boric acid, gypsum, phosphates, gluconates, or a mixture of these) is included in the composition. The retardant can be present, for example, in an amount of from 0.4% to 7.5% based on the weight of the reactive powder. In some examples, the weight ratio of water to reactive powder is from 0.06:1 to 0.25:1 (e.g., from 0.06:1 to less than 0.15:1). In some examples, the inorganic polymer is substantially free from retardants.

The inorganic polymer can further include aggregate, such as lightweight aggregate. The inorganic polymers can further include fibers, a photocatalyst, a water reducer, a plasticizer (e.g., clay or a polymer), a pigment, or a blowing agent.

The organic polymer included in the composites can be, for example, a polyurethane. In some examples, the polyurethane is foamed. The first layer of the composite can be directly adhered to the second layer without the use of an adhesive layer. In some examples, the composite includes 75% by weight or greater of the organic polymer and 25% by weight or less of the inorganic polymer.

Also described are building materials including the composites described herein. The building material can be, for example, synthetic stone or panels.

Further described is a method of producing an inorganic polymer/organic polymer composite. The method includes mixing water and reactants comprising a reactive powder, an activator, and optionally a retardant to produce an inorganic polymer reactive mixture, applying a first layer to a surface, and applying a second layer to a surface of the first layer to produce the inorganic polymer/organic polymer composite. In the composite, one of the first layer and the second layer is the inorganic polymer reactive mixture and the other of the first layer and the second layer is an organic polymer. Optionally, the method is continuous.

In some embodiments, the first layer is the inorganic polymer reactive mixture and the second layer is the organic polymer. In these embodiments, the method can further include allowing the inorganic polymer reactive mixture to cure prior to applying the organic polymer. In some examples, the organic layer can be extruded onto the inorganic polymer layer. Optionally, the organic polymer layer is applied directly onto the inorganic polymer layer.

In some embodiments, the first layer is the organic polymer and the second layer is the inorganic polymer reactive mixture. In these embodiments, the method can further include allowing the organic polymer to cure prior to applying the inorganic polymer reactive mixture. In some examples, the inorganic polymer reactive mixture is extruded onto the organic polymer layer. Optionally, the inorganic polymer reactive mixture is applied directly onto the organic polymer layer.

In some examples, the method can include allowing the inorganic polymer/organic polymer composite to cure together. The inorganic polymer/organic polymer composite can be allowed to cure, for example, at ambient temperature or at an elevated temperature.

The reactive powder includes fly ash. In some examples, the reactants are mixed for a period of 15 seconds or less. The mixing can be performed, for example, at ambient temperature. In some examples, the activator includes citric acid and sodium hydroxide. Optionally, the citric acid and sodium hydroxide are combined prior to mixing with the reactants. The weight ratio of the citric acid to sodium hydroxide can be from 0.4:1 to 2.0:1 (e.g., from 1.0:1 to 1.6:1). In some examples, the activator is provided as an aqueous solution in a concentration of from 10% to 50% based on the weight of the solution.

The details of one or more embodiments are set forth in the description below. Other features, objects, and advantages will be apparent from the description and from the claims.

DETAILED DESCRIPTION

Inorganic polymer/organic polymer composites and methods for their preparation are described herein. The inorganic polymer/organic polymer composites comprise a first layer comprising an inorganic polymer and a second layer adhered to the first layer comprising an organic polymer. The inorganic polymer is formed by reacting a reactive powder, an activator, and optionally a retardant in the presence of water. The reactive powder comprises fly ash and less than 10% by weight portland cement.

The reactive powder is a reactant used to form the inorganic polymer compositions described herein. The reactive powder for use in the reactions includes fly ash. Fly ash is produced from the combustion of pulverized coal in electrical power generating plants. Fly ash produced by coal-fueled power plants is suitable for use in reactive powder described herein. The fly ash can include Class C fly ash, Class F fly ash, or a mixture thereof. As such, the calcium content of the fly ash can vary. In exemplary compositions, the fly ash included in the reactive powder can have a calcium content, expressed as the oxide form (i.e., calcium oxide), of from 18% to 35% by weight. In some examples, the calcium oxide content of the fly ash is from 23% to 30% by weight.

In some examples, the majority of the fly ash present is Class C fly ash (i.e., greater than 50% of the fly ash present is Class C fly ash). In some examples, greater than 75%, greater than 85%, or greater than 95% of the fly ash present is Class C fly ash. For example, greater than 75%, greater than 76%, greater than 77%, greater than 78%, greater than 79%, greater than 80%, greater than 81%, greater than 82%, greater than 83%, greater than 84%, greater than 85%, greater than 86%, greater than 87%, greater than 88%, greater than 89%, greater than 90%, greater than 91%, greater than 92%, greater than 93%, greater than 94%, greater than 95%, greater than 96%, greater than 97%, greater than 98%, or greater than 99% of the fly ash present is Class C fly ash. In some embodiments, only Class C fly ash is used. In some embodiments, blends of Class C fly ash and Class F fly ash can be used, particularly if the overall CaO content is as discussed above.

Optionally, the majority of the fly ash present can be Class F fly ash (i.e., greater than 50% of the fly ash present is Class F fly ash). In some examples, greater than 75%, greater than 85%, or greater than 95% of the fly ash present is Class F fly ash. For example, greater than 75%, greater than 76%, greater than 77%, greater than 78%, greater than 79%, greater than 80%, greater than 81%, greater than 82%, greater than 83%, greater than 84%, greater than 85%, greater than 86%, greater than 87%, greater than 88%, greater than 89%, greater than 90%, greater than 91%, greater than 92%, greater than 93%, greater than 94%, greater than 95%, greater than 96%, greater than 97%, greater than 98%, or greater than 99% of the fly ash present is Class F fly ash. In some embodiments, only Class F fly ash is used.

The fly ash used in the reactive powder can be a fine fly ash. The use of a fine fly ash provides a higher surface area. As used herein, fine fly ash refers to fly ash having an average particle size of 25 microns or less. The average particle size for the fly ash can be from 5 microns to 25 microns, or from 10 microns to 20 microns.

Optionally, the fly ash is the principal component of the reactive powder. In some examples, the fly ash is present in an amount of greater than 85% by weight of the reactive powder, greater than 90% by weight of the reactive powder, or greater than 95% by weight of the reactive powder. For example, the fly ash can be present in an amount of greater than 85% by weight, greater than 86% by weight, greater than 87% by weight, greater than 88% by weight, greater than 89% by weight, greater than 90% by weight, greater than 91% by weight, greater than 92% by weight, greater than 93% by weight, greater than 94% by weight, greater than 95% by weight, greater than 96% by weight, greater than 97% by weight, greater than 98% by weight, or greater than 99% by weight based on the weight of the reactive powder.

The reactive powder for use as a reactant to form the inorganic polymer compositions can further include cementitious components, including portland cement, calcium aluminate cement, and/or slag. Optionally, portland cement can be included as a component of the reactive powder. Suitable types of portland cement include, for example, Type I ordinary portland cement (OPC), Type II OPC, Type III OPC, Type IV OPC, Type V OPC, low alkali versions of these portland cements, and mixtures of these portland cements. In these examples, less than 10% by weight of portland cement is included in the reactive powder. In some examples, the reactive powder includes less than 5% by weight, less than 3% by weight, or less than 1% by weight of portland cement. For example, the reactive powder can include portland cement in an amount of less than 10% by weight, less than 9% by weight, less than 8% by weight, less than 7% by weight, less than 6% by weight, less than 5% by weight, less than 4% by weight, less than 3% by weight, less than 2% by weight, less than 1% by weight, or less than 0.5% by weight. In some examples, the reactive powder is substantially free from portland cement. For example, the reactive powder can include less than 0.1% by weight, less than 0.01% by weight, or less than 0.001% by weight of portland cement based on the weight of the reactive powder. In some embodiments, the reactive powder includes no portland cement.

Optionally, calcium aluminate cement (i.e., high aluminate cement) can be included in the reactive powder. In some examples, the calcium aluminate cement is present in an amount of 5% or less by weight of the reactive powder. For example, the reactive powder can include calcium aluminate cement in an amount of 5% or less, 4% or less, 3% or less, 2% or less, 1% or less, 0.9% or less, 0.8% or less, 0.7% or less, 0.6% or less, 0.5% or less, 0.4% or less, 0.3% or less, 0.2% or less, or 0.1% or less by weight. In some examples, the reactive powder can include calcium aluminate cement in an amount of from 0.5% to 5%, from 1% to 4.5%, or from 2% to 4% by weight. The calcium aluminate cement can be used, in some examples, in compositions that include less than 3% hydrated or semihydrated forms of calcium sulfate (e.g., gypsum). In some examples, the reactive powder is substantially free from calcium aluminate cement or includes no calcium aluminate cement.

The reactive powder can also include a ground slag such as blast furnace slag in an amount of 10% or less by weight. For example, the reactive powder can include slag in an amount of 10% or less, 9% or less, 8% or less, 7% or less, 6% or less, 5% or less, 4% or less, 3% or less, 2% or less, or 1% or less by weight.

The reactive powder can also include calcium sources such as limestone (e.g., ground limestone), quicklime, slaked lime, or hydrated lime in an amount of 10% or less by weight of the reactive powder. For example, limestone can be present in an amount of 10% or less, 9% or less, 8% or less, 7% or less, 6% or less, 5% or less, 4% or less, 3% or less, 2% or less, or 1% or less by weight of the reactive powder.

The reactive powder can also include a tricalcium aluminate additive. As would be understood by those skilled in the art, tricalcium aluminate is present in a small amount in portland cement. The tricalcium aluminate would be present as an additive, wherein the tricalcium aluminate is not a portland cement constituent. The tricalcium aluminate additive can be present in an amount of from 0.1% to 10% by weight, or 1% to 5% of the reactive powder.

Anhydrous calcium sulfate can be optionally included as an additional reactant used to form the inorganic polymer compositions described herein. The anhydrous calcium sulfate can be present as a reactant in an amount of 0.1% by weight or greater based on the weight of the reactive powder and has been found to increase the compressive strength of the inorganic polymer products. In some examples, the anhydrous calcium sulfate can be present in an amount of from 1% to 10%, 2% to 8%, 2.5% to 7%, or 3% to 6% by weight of the reactive powder. For example, the amount of anhydrous calcium sulfate can be 0.5% or greater, 1% or greater, 1.5% or greater, 2% or greater, 2.5% or greater, 3% or greater, 3.5% or greater, 4% or greater, 4.5% or greater, or 5% or greater based on the weight of the reactive powder.

An activator is a further reactant used to form the inorganic polymer compositions described herein. The activator allows for rapid setting of the inorganic polymer compositions and also imparts compressive strength to the compositions. The activator can include one or more of acidic, basic, and/or salt components. For example, the activator can include citrates, hydroxides, metasilicates, carbonates, aluminates, sulfates, and/or tartrates. The activator can also include other multifunctional acids that are capable of complexing or chelating calcium ions (e.g., EDTA). Specific examples of suitable citrates for use as activators include citric acid and its salts, including, for example, sodium citrate and potassium citrate. Specific examples of suitable tartrates include tartaric acid and its salts (e.g., sodium tartrate and potassium tartrate). In some examples, the activator can include alkali metal hydroxides, such as sodium hydroxide and potassium hydroxide. Further examples of suitable activators include metasilicates (e.g., sodium metasilicate and potassium metasilicate); carbonates (e.g., sodium carbonate and potassium carbonate); aluminates (e.g., sodium aluminate and potassium aluminate); and sulfates (e.g., sodium sulfate and potassium sulfate). In some examples, the activator includes citric acid, tartaric acid, or mixtures thereof. In some examples, the activator includes sodium hydroxide. In some examples, the activator includes a mixture of citric acid and sodium hydroxide. In examples including a mixture of citric acid and sodium hydroxide, the weight ratio of citric acid present in the mixture to sodium hydroxide present in the mixture is from 0.4:1 to 2.0:1, 0.6:1 to 1.9:1, 0.8:1 to 1.8:1, 0.9:1 to 1.7:1, or 1.0:1 to 1.6:1. The activator components can be pre-mixed prior to being added to the other reactive components in the inorganic polymer or added separately to the other reactive components. For example, citric acid and sodium hydroxide could be combined to produce sodium citrate and the mixture can include possibly one or more of citric acid and sodium hydroxide in stoichiometric excess. In some embodiments, the activator includes a stoichiometric excess of sodium hydroxide. The total amount of activators can include less than 95% by weight of citrate salts. For example, the total amount of activator can include from 25-85%, 30-75%, or 35-65% citrate salts by weight. The mixture in solution and the mixture when combined with reactive powder can have a pH of from 12 to 13.5 or about 13.

The activator can be present as a reactant in an amount of from 1.5% to 8.5% dry weight based on the weight of the reactive powder. For example, the activator can be present in an amount of from 2% to 8%, from 3% to 7%, or from 4% to 6%. In some examples, the activator can be present in an amount of 1.5%, 2%, 2.5%, 3%, 3.5%, 4%, 4.5%, 5%, 5.5%, 6%, 6.5%, 7%, 7.5%, 8% or 8.5% dry weight based on the weight of the reactive powder. For example, when sodium hydroxide and citric acid are used as the activators, the amount of sodium hydroxide used in the activator solution can be from 0.3 to 15.6, 0.5 to 10, 0.75 to 7.5, or 1 to 5 dry parts by weight based on the weight of reactive powder and the amount of citric acid used in the activator solution can be from 0.25 to 8.5, 0.5 to 0.7, 0.75 to 0.6, or 1 to 4.5 dry parts by weight based on the weight of reactive powder. The resulting activator solution can include sodium citrate and optionally one or more of citric acid or sodium hydroxide.

The activator can be provided, for example, as a solution. In some examples, the activator can be provided in water as an aqueous solution in a concentration of from 10% to 50% or from 20% to 40% based on the weight of the solution. For example, the concentration of the activator in the aqueous solution can be from 25% to 35% or from 28% to 32% based on the weight of the solution. Examples of suitable concentrations for the activator in the aqueous solution include 10%, 15%, 20%, 25%, 30%, 35%, 40%, 45%, or 50% based on the weight of the solution.

The reactants used to form the inorganic polymer compositions can further include a retardant. Retardants are optionally included to prevent the composition from stiffening too rapidly, which can result in a reduction of strength in the structure. Examples of suitable retardants for inclusion as reactants include borax, boric acid, gypsum, phosphates, gluconates, or a mixture of these. The retardant can be provided in solution with the activator (e.g., borax or boric acid) and/or can be provided as an additive with the reactive powder (e.g., gypsum). In some examples, the retardant is present in an amount of from 0.4% to 7.5% based on the weight of the reactive powder. For example, the retardant can be present in an amount of from 0.5% to 5%, 0.6% to 3%, 0.7 to 2.5%, or 0.75% to 2.0% based on the weight of the reactive powder. In some embodiments, when gypsum is used as a retardant, it is used in an amount of 3% by weight or less based on the weight of the reactive powder. In some embodiments, borax is used as the retardant. When citric acid and sodium hydroxide are used as the activators, the weight ratio of borax to sodium hydroxide can be 0.3:1 to 1.2:1 (e.g., 0.8:1 to 1.0:1). In some examples, lower ratios of 0.3:1 to 0.8:1 can be the result of including an additional retardant such as gypsum. In some examples, the composition is substantially free from retardants or includes no retardants.

The reactants described herein can optionally include less than 3.5% by weight of additional sulfates. As would be understood by those skilled in the art, sulfates are present in the fly ash. Thus, "additional sulfates" refers to sulfates other than those provided by the fly ash. In some examples, the composition can include less than 3.5% by weight of sulfates based on the amount of reactive powder other than those provided by the fly ash. For example, the composition can include less than 3.5% by weight, less than 3% by weight, less than 2.5% by weight, less than 2% by weight, less than 1.5% by weight, less than 1% by weight, or less than 0.5% by weight of sulfates based on the amount of reactive powder other than those provided by the fly ash. In some examples, the composition is substantially free from additional sulfates. For example, the composition can include less than 0.1% by weight, less than 0.01% by weight, or less than 0.001% by weight of additional sulfates based on the amount of reactive powder. In some embodiments, the composition includes no additional sulfates.

When present, the additional sulfates can be provided in the form of gypsum (i.e., calcium sulfate dihydrate). As described above, gypsum can be present in the composition as a retardant. In some examples, the composition includes gypsum in an amount of less than 3.5% by weight based on the amount of reactive powder. For example, the composition can include gypsum in an amount of less than 3.5% by weight, less than 3% by weight, less than 2.5% by weight, less than 2% by weight, less than 1.5% by weight, less than 1% by weight, or less than 0.5% by weight.

The reactants are provided in the reactive mixture in the presence of water. The water can be provided in the reactive mixture by providing the activator and optionally the retardant in solution and/or by adding water directly to the reactive mixture. The solution to binder or solution to reactive powder weight ratio (i.e., the ratio of the solution including activator and optionally the retardant to reactive powder) can be from 0.12:1 to 0.5:1, depending on the product being made and the process being used for producing the product. The water to reactive powder (or water to binder) weight ratio can be from 0.06:1 to 0.4:1, depending on the product being made and the process being used for producing the product. In some embodiments, the water to binder ratio can be from 0.06:1 to 0.25:1, from 0.09:1 to less than 0.15:1, or from 0.095:1 to less than 0.14:1 (e.g., less than 0.10:1). For example, the water to binder ratio can be from 0.06:1 to less than 0.15:1. In some embodiments, the water to binder ratio can be from 0.15:1 to 0.4:1, particularly when aggregate is used that absorbs a significant amount of water or solution (e.g., 20-30%). In some embodiments, the water to binder ratio is from 0.15:1 to 0.25:1 or can be from 0.25 to 0.4:1. The water to binder ratio can be 0.06:1, 0.07:1, 0.08:1, 0.09:1, 0.10:1, 0.11:1, 0.12:1, 0.13:1, 0.14:1, 0.15:1, 0.16:1, 0.17:1, 0.18:1, 0.19:1, 0.20:1, 0.21:1, 0.22:1, 0.23:1, 0.24:1, 0.25:1, 0.26:1, 0.27:1, 0.28:1, 0.29:1, 0.30:1, 0.31:1, 0.32:1, 0.33:1, 0.34:1, 0.35:1, 0.36:1, 0.37:1, 0.38:1, 0.39:1, or 0.40:1.

The inorganic polymer can have a calcia to silica molar ratio of from 0.6:1 to 1.1:1. For example, the calcia to silica molar ratio can be 0.6:1, 0.7:1, 0.8:1, 0.9:1, 1.0:1 or 1.1:1.

One or more aggregates or fillers can be further used in the inorganic polymer compositions described herein. In some examples, the aggregate includes lightweight aggregate. Examples of suitable lightweight aggregate includes bottom ash, expanded clay, expanded shale, expanded perlite, vermiculite, volcanic tuff, pumice, hollow ceramic spheres, hollow plastic spheres, expanded plastic beads (e.g., polystyrene beads), ground tire rubber, and mixtures of these. Further examples of suitable aggregates and fillers include other types of ash such as those produced by firing fuels including industrial gases, petroleum coke, petroleum products, municipal solid waste, paper sludge, wood, sawdust, refuse derived fuels, switchgrass, or other biomass material; ground/recycled glass (e.g., window or bottle glass); milled glass; glass spheres; glass flakes; activated carbon; calcium carbonate; aluminum trihydrate (ATH); silica; sand; alluvial sand; natural river sand; ground sand; crushed granite; crushed limestone; silica fume; slate dust; crusher fines; red mud; amorphous carbon (e.g., carbon black); clays (e.g., kaolin); mica; talc; wollastonite; alumina; feldspar; bentonite; quartz; garnet; saponite; beidellite; granite; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; soy meal; pulverized foam; and mixtures thereof.

In some embodiments, inorganic fibers or organic fibers can be included in the inorganic polymer compositions, e.g., to provide increased strength, stiffness or toughness. In some examples, fire resistant or retardant glass fibers can be included to impart fire resistance or retarding properties to the inorganic polymer compositions. Fibers suitable for use with the inorganic polymer compositions described herein can be provided in the form of individual fibers, fabrics, rovings, or tows. These can be chopped and can be provided before or during the mixing of the inorganic polymer reactants to provide desired fiber lengths. Alternately, the fibers can be added after the inorganic polymer reactants have been mixed. The fibers can be up to about 2 in. in length. In some examples, the fibers are about 10 mm in length. The fibers can be provided in a random orientation or can be axially oriented. The fibers can be coated with a sizing to modify performance to make the fibers reactive. Exemplary fibers include glass, polyvinyl alcohol (PVA), carbon, basalt, wollastonite, and natural (e.g., bamboo or coconut) fibers. Examples of suitable fibers and methods of providing fibers in cementitious compositions are found, for example, in U.S. Pat. No. 5,108,679, which is herein incorporated by reference. The fibers can be included in an amount of 0.1% to 6% based on the weight of reactive powder. For example, the fibers can be included in an amount of 0.5% to 5%, 0.75% to 4%, or 1% to 3% based on the weight of reactive powder. In some embodiments, the fibers are provided in an amount of 2% or less by weight, based on the weight of the cementitious composition including aggregate.

The inclusion of aggregate or filler in the inorganic polymer compositions described herein can modify and/or improve the chemical and mechanical properties of the compositions. For example, the optimization of various properties of the compositions allows their use in building materials and other structural applications. High aggregate and filler loading levels can be used in combination with the compositions without a substantial reduction of (and potentially an improvement in) the intrinsic structural and physical properties of the inorganic polymer compositions. Further, the use of lightweight aggregate provides lightweight building products without compromising the mechanical properties of the inorganic polymer compositions.

The aggregate or filler can be added to the composition at a weight ratio of 0.5:1 to 4.0:1 based on the weight of reactive powder (i.e., aggregate to binder weight ratio). In some embodiments, the aggregate to binder weight ratio can be from 0.5:1 to 2.5:1 or from 1:1 to 2:1 depending on the product to be produced. In some embodiments, the aggregate to binder weight ratio can be from 1.5:1 to 4:1 or from 2:1 to 3.5:1. For example, the aggregate to binder weight ratio can be 0.5:1, 0.6:1, 0.7:1, 0.8:1, 0.9:1, 1.0:1, 1.1:1, 1.2:1, 1.3:1, 1.4:1, 1.5:1, 1.6:1, 1.7:1, 1.8:1, 1.9:1, 2.0:1, 2.1:1, 2.2:1, 2.3:1, 2.4:1, 2.5:1, 2.6:1, 2.7:1, 2.8:1, 2.9:1, 3.0:1, 3.1:1, 3.2:1, 3.3:1, 3.4:1, 3.5:1, 3.6:1, 3.7:1, 3.8:1, 3.9:1, or 4.0:1.

Additional components useful with the compositions described herein include water reducers, plasticizers, pigments, foaming agents (e.g., air-entraining agents) or blowing agents, anti-efflorescence agents, photocatalysts, ultraviolet light stabilizers, fire retardants, antimicrobials, and antioxidants.

Water reducers can be included in the compositions described herein to reduce the amount of water in the composition while maintaining the workability, fluidity, and/or plasticity of the composition. In some examples, the water reducer is a high-range water reducer, such as, for example, a superplasticizer admixture. Examples of suitable water reducers include lignin, naphthalene, melamine, polycarboxylates, lignosulfates and formaldehyde condensates (e.g., sodium naphthalene sulfonate formaldehyde condensate). Water reducers can be provided in an amount of from greater than 0 to 1% by weight based on the weight of reactive powder.

Plasticizers can also be included in the compositions described herein. Plasticizers enhance the extrudability of the inorganic polymer compositions. Examples of suitable plasticizers for use with the compositions described herein include clays (e.g., bentonite, expanded clay, and kaolin clay) and polymers (e.g., JEFFSPERSE X3202, JEFFSPERSE X3202RF, and JEFFSPERSE X3204, each commercially available from Huntsman Polyurethanes; Geismar, La.).

Pigments or dyes can optionally be added to the compositions described herein. An example of a pigment is iron oxide, which can be added in amounts ranging from 1 wt % to 7 wt % or 2 wt % to 6 wt %, based on the weight of reactive powder.

Foaming and/or blowing agents can be added to the compositions described herein to produce a foamed composition. Foaming agents can be used to help the system maintain air or other gases, e.g., from the mixing process. Examples of suitable foaming agents include sodium alkyl ether sulfate, ammonium alkyl ether sulfate, sodium alpha olefin sulfonate, sodium deceth sulfate, ammonium deceth sulfate, sodium laureth sulfate, and sodium dodecylbenzene sulfonate. Blowing agents can be included in the compositions to produce a gas and generate a foamed composition. Examples of suitable blowing agents include aluminum powder, sodium perborate, and $H_2O_2$. The foaming agents and/or blowing agents can be provided in an amount of 0.1% or less based on the weight of the reactive powder.

Anti-efflorescence agents can be included in the compositions to limit the transport of water through the structure and thus limit the unbound salts that are brought to the surface of the structure thereby limiting the aesthetic properties of the structure. Suitable anti-efflorescence agents include siloxanes, silanes, stearates, amines, fatty acids (e.g., oleic acid and linoleic acid), organic sealants (e.g., polyurethanes or acrylics), and inorganic sealants (e.g., polysilicates). Anti-efflorescence agents can be included in the compositions in an amount of from 0.01 wt % to about 1 wt % based on the weight of the reactive powder.

Photocatalysts such as anatase (titanium dioxide) can be used that produce superoxidants that can oxidize $NO_X$ and VOC's to reduce pollution. The photocatalysts can make the system super hydrophobic and self-cleaning (e.g., in the presence of smog). These materials can also act as antimicrobials and have impact on algae, mold, and/or mildew growth.

Ultraviolet (UV) light stabilizers, such as UV absorbers, can be added to the compositions described herein. Examples of UV light stabilizers include hindered amine type stabilizers and opaque pigments like carbon black powder. Fire retardants can be included to increase the flame or fire resistance of the compositions. Antimicrobials, such as copper complexes, can be used to limit the growth of mildew and other organisms on the surface of the compositions. Antioxidants, such as phenolic antioxidants, can also be added. Antioxidants can provide increased UV protection, as well as thermal oxidation protection.

As described above, the composite further includes a second layer adhered to the inorganic polymer layer. The second layer includes an organic polymer. The organic polymer be selected from the group consisting of polyurethanes, epoxies, polyesters, polystyrenes, polyethylenes, polypropylenes, polyvinyl chlorides, nylons, phenolics, acrylic polymers, styrene-butadiene copolymers, acrylonitrile-butadiene-styrene copolymers, and blends thereof. In some embodiments, the organic polymer can include a filler, fibers, or other materials to enhance the properties of the organic polymer.

In some embodiments, the organic polymer is a polyurethane. The polyurethane can be formed by the reaction of an isocyanate, a polyol, and optionally a filler such as coal ash (e.g., fly ash). The isocyanate can be selected from the group consisting of diisocyanates, polyisocyanates, and mixtures thereof. The polyol can include, for example, polyester polyols or polyether polyols. The coal ash can be present in amounts from about 40% to about 90% by weight of the organic polymer layer. Polyurethanes useful as the organic polymers described herein include those formed by the reaction of one or more monomeric, oligomeric poly- or di-isocyanates, or mixtures of these (sometimes referred to as isocyanate) and one or more polyols. Examples of suitable polyols include polyester polyols and polyether polyols.

Polyols or combinations of polyols useful with the polyurethanes described herein have an average functionality of about 1.5 to about 8.0. Useful polyols additionally have an average functionality of about 1.6 to about 6.0, about 1.8 to about 4.0, about 2.5 to about 3.5, or about 2.6 to about 3.1. The average hydroxyl number values for polyols useful with the polyurethanes described herein include hydroxyl numbers from about 100 to about 600, about 150 to about 550, about 200 to about 500, about 250 to about 440, about 300 to about 415, and about 340 to about 400.

In some examples, the polyol includes one or more plant-based polyols. The use of plant-based polyols increases the environmental content of the organic polymers. As discussed above, the one or more plant-based polyols can include castor oil. Castor oil is a well-known, commercially available material, and is described, for example, in Encyclopedia of Chemical Technology, Volume 5, John Wiley & Sons (1979). Suitable castor oils include those sold by Vertellus Specialities, Inc., e.g., DB® Oil, and Eagle Specialty Products, e.g., T31® Oil.

The one or more plant-based polyols useful with the organic polymers described herein can include polyols containing ester groups that are derived from plant-based fats and oils. Accordingly, the one or more plant-based polyols can contain structural elements of fatty acids and fatty alcohols. Starting materials for the plant-based polyols of the polyurethane component include fats and/or oils of plant-based origin with preferably unsaturated fatty acid residues. The one or more plant-based polyols useful with the polyurethanes described herein can include, for example, castor oil; coconut oil; corn oil; cottonseed oil; lesquerella oil; linseed oil; olive oil; palm oil; palm kernel oil; peanut oil; sunflower oil; tall oil; and mixtures thereof. In some embodiments, the one or more plant-based polyols can be derived from soybean oil as the plant-based oil.

In some embodiments, the one or more polyols can include highly reactive polyols that include a large number of primary hydroxyl groups (e.g. 75% or more or 80% or more) as determined using fluorine NMR spectroscopy as described in ASTM D4273 [34]. In some embodiments, the highly reactive polyol can have a primary hydroxyl number, defined as the hydroxyl number multiplied by the percentage of primary hydroxyl groups based on the total number of hydroxyl groups, of greater than 250. Exemplary highly reactive polyols include plant-based polyols such as Pel-Soy 744 and Pel-Soy P-750, soybean oil based polyols commercially available from Pelron Corporation; Agrol Diamond, a soybean oil based polyol commercially available from BioBased Technologies; Ecopol 122, Ecopol 131 and Ecopol 132, soybean oil polyols formed using polyethylene terephthalate and commercially available from Ecopur Industries; Honey Bee HB-530, a soybean oil-based polyol commerically available from MCPU Polymer Engineering; Renewpol, a castor oil-based polyol commercially available from Styrotech Industries (Brooklyn Park, Minn.); JeffAdd B 650, a 65% bio-based content (using ASTM D6866-06) additive based on soybean oil commercially available from Huntsman Polyurethanes (Auburn Hills, Mich.); Stepanpol PD-110 LV and PS 2352, polyols based on soybean oil, diethylene glycol and phthalic anhydride and commercially available from Stepan Company; and derivatives thereof. In some embodiments, the highly reactive plant-based polyols can be formed by the reaction of a soybean oil and a polyester to produce a plant-based polyester polyol. An example of such a soybean oil-based polyester polyol is Ecopol 131, which is a highly reactive aromatic polyester polyol comprising 80% primary hydroxyl groups. Polyester polyols can be prepared using recyclable polyester to further increase the recyclable content of an organic polymer and Ecopol 131 is an example of such a polyester polyol. In some embodiments, the soybean oil and polyester based polyol can be prepared using recycled polyester. In some embodiments, the polyol can include renewable and recyclable content.

The castor oil component when combined with a highly reactive polyol such as Ecopol 131 also provides benefits such as increased resiliency, toughness and handleability. The castor oil and highly reactive polyol can be combined in various percentages, e.g., 15-40% of the castor oil and 60-85% of the highly reactive polyol. The castor oil also can provide a polyurethane foam product that is harder to break and thus that can be used for more demanding applications.

Isocyanates useful with the polyurethanes described herein include one or more monomeric or oligomeric poly- or di-isocyanates. The monomeric or oligomeric poly- or di-isocyanate include aromatic diisocyanates and polyisocyanates. The isocyanates can also be blocked isocyanates. An example of a useful diisocyanate is methylene diphenyl diisocyanate (MDI). Useful MDIs include MDI monomers, MDI oligomers, and mixtures thereof.

Further examples of useful isocyanates include those having NCO (i.e., the reactive group of an isocyanate) contents ranging from about 25% to about 35% by weight. Examples of useful isocyanates are found, for example, in *Polyurethane Handbook: Chemistry, Raw Materials, Processing Application, Properties,* 2$^{nd}$ Edition, Ed: Gunter Oertel; Hanser/Gardner Publications, Inc., Cincinnati, Ohio, which is herein incorporated by reference. Suitable examples of aromatic polyisocyanates include 2,4- or 2,6-toluene diisocyanate, including mixtures thereof; p-phenylene diisocyanate; tetramethylene and hexamethylene diisocyanates; 4,4-dicyclohexylmethane diisocyanate; isophorone diisocyanate; 4,4-phenylmethane diisocyanate; polymethylene polyphenylisocyanate; and mixtures thereof. In addition, triisocyanates may be used, for example, 4,4,4-triphenylmethane triisocyanate; 1,2,4-benzene triisocyanate; polymethylene polyphenyl polyisocyanate; methylene polyphenyl polyisocyanate; and mixtures thereof. Suitable blocked isocyanates are formed by the treatment of the isocyanates described herein with a blocking agent (e.g., diethyl malonate, 3,5-dimethylpyrazole, methylethylketoxime, and caprolactam). Isocyanates are commercially available, for example, from Bayer Corporation (Pittsburgh, Pa.) under the trademarks MONDUR and DESMODUR. Other examples of suitable isocyanates include Mondur MR Light (Bayer Corporation; Pittsburgh, Pa.), PAPI 27 (Dow Chemical Company; Midland, Mich.), Lupranate M20 (BASF Corporation; Florham Park, N.J.), Lupranate M70L (BASF Corporation; Florham Park, N.J.), Rubinate M (Huntsman Polyurethanes; Geismar, La.), Econate 31 (Ecopur Industries), and derivatives thereof.

The average functionality of isocyanates or combinations of isocyanates useful with the organic polymers described herein is between about 1.5 to about 5. Further, examples of useful isocyanates include isocyanates with an average functionality of about 2 to about 4.5, about 2.2 to about 4, about 2.4 to about 3.7, about 2.6 to about 3.4, and about 2.8 to about 3.2.

As indicated above, in the polyurethanes for use in the organic polymers described herein, an isocyanate is reacted with a polyol. In general, the ratio of isocyanate groups to the total isocyanate reactive groups, such as hydroxyl groups, water and amine groups, is in the range of about 0.5:1 to about 1.5:1, which when multiplied by 100 produces an isocyanate index between 50 and 150. Additionally, the isocyanate index can be from about 80 to about 120, from about 90 to about 120, from about 100 to about 115, or from about 105 to about 110. As used herein, an isocyanate may be selected to provide a reduced isocyanate index, which can be reduced without compromising the chemical or mechanical properties of the organic polymer.

The organic polymers (e.g., the polyurethanes) described herein can be formulated with a high total environmental content. As used herein, the term total environmental content refers to the sum of the total renewable content and the total recyclable content used to form an organic polymer and is expressed as a weight percent. As used herein, renewable content refers to matter that is provided by natural processes or sources. Examples of renewable content include alcohol and oils from plants, such as castor oil and soybean oil. Isocyanates derived from natural oil, such as castor oil pre-polymers and soybean oil pre-polymers, are also examples of renewable content. As used herein, recyclable content includes content that is derived from materials that would otherwise have been discarded. Examples of recyclable content include a recyclable polyol (e.g., one derived from recyclable polyester), glycerin sourced from a biodiesel plant, and a coal ash. Renewable content and recyclable content are used in the composites described herein to produce organic polymers with a high total environmental content.

As described above, the organic polymers described herein can include a filler such as coal ash. The coal ash can be fly ash, bottom ash, or combinations thereof. In some examples, the coal ash used is fly ash. Fly ash is produced from the combustion of pulverized coal in electrical power generating plants. The fly ash useful with the organic polymers described herein can be Class C fly ash, Class F fly ash, or a mixture thereof. Fly ash produced by coal-fueled power plants is suitable for incorporation in composites described herein.

Coal ash is present in the organic polymers described herein in amounts from about 40% to about 90% by weight. Further, coal ash can be present in amounts from about 60% to about 85%. Examples of the amount of coal ash present in the organic polymers described herein include about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, or about 90%.

Instead of or in addition to coal ash, other fillers can be used in the organic polymers described herein. Examples of fillers useful with the organic polymers include other types of ash such as those produced by firing fuels including industrial gases, petroleum coke, petroleum products, municipal solid waste, paper sludge, wood, sawdust, refuse derived fuels, switchgrass or other biomass material. The one of more additional fillers can also include ground/recycled glass (e.g., window or bottle glass); milled glass; glass spheres; glass flakes; activated carbon; calcium carbonate; aluminum trihydrate (ATH); silica; sand; ground sand; silica fume; slate dust; crusher fines; red mud; amorphous carbon (e.g., carbon black); clays (e.g., kaolin); mica; talc; wollastonite; alumina; feldspar; bentonite; quartz; garnet; saponite; beidellite; granite; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; inorganic fibers; soy meal; pulverized foam; and mixtures thereof.

In some embodiments, inorganic fibers or organic fibers can be included in the organic polymer layer, e.g., to provide increased strength, stiffness or toughness. Fibers suitable for use with the organic polymers described herein can be provided in the form of individual fibers, fabrics, rovings, or tows. These can be added prior to polymerization and can be chopped before or during the mixing process to provide desired fiber lengths. Alternately, the fibers can be added after polymerization, for example, after the organic polymer exits the mixing apparatus. The fibers can be up to about 2 in. in length. The fibers can be provided in a random orientation or can be axially oriented. The fibers can be coated with a sizing to modify performance to make the fibers reactive. Exemplary fibers include glass, polyvinyl alcohol (PVA), carbon, basalt, wollastonite, and natural (e.g., bamboo or coconut) fibers.

The inclusion of fillers in the organic polymers as described herein can modify and/or improve the chemical and mechanical properties of the organic polymers. For example, the optimization of various properties of the organic polymers allows their use in building materials and other structural applications. High filler loading levels can be used in organic polymers without a substantial reduction of (and potentially an improvement in) the intrinsic structural, physical, and mechanical properties of a composite.

The use of filled organic polymers in composites for use as building materials has advantages over organic polymers made using lower filler levels or no filler. For example, the use of higher filler loading levels in building materials may allow the building materials to be produced at a substantially decreased cost. The use of large filler loadings also provides environmental advantages. For example, the incorporation of recyclable or renewable material, e.g., fly ash, as filler, provides an organic polymer with a higher percentage of environmentally friendly materials, i.e., a higher total environmental content. The use of the environmentally friendly materials in these composites decreases the need of landfills and other waste facilities to store such material. Another environmental benefit of using recyclable or renewable materials as filler in these composites includes reducing the production of virgin fillers that may involve energy-intensive methods for their creation and may produce waste or by-product materials.

One or more catalysts are added to facilitate curing and can be used to control the curing time of the polyurethanes. Examples of useful catalysts include amine-containing catalysts (such as DABCO and tetramethylbutanediamine) and tin-, mercury-, and bismuth-containing catalysts. In some embodiments, 0.01 wt % to 2 wt % catalyst or catalyst system (e.g., 0.025 wt % to 1 wt %, 0.05 wt % to 0.5 wt %, or 0.1 wt % to about 0.25 wt %) can be used.

Additional components useful with the organic polymers described herein include foaming agents, blowing agents, surfactants, chain-extenders, crosslinkers, coupling agents, UV stabilizers, fire retardants, antimicrobials, anti-oxidants, and pigments. Though the use of such components is well known to those of skill in the art, some of these additional additives are further described herein.

In some embodiments, the organic polymer is foamed. Foaming agents and blowing agents can be added to the organic polymers described herein to produce a foamed version of the organic polymers. Examples of blowing agents include organic blowing agents, such as halogenated hydrocarbons, acetone, hexanes, and other materials that have a boiling point below the reaction temperature. Chemical foaming agents include azodicarbonamides (e.g., Celogen manufactured by Lion Copolymer Geismar); and other materials that react at the reaction temperature to form gases such as carbon dioxide. In the case of polyurethanes, water can be used as a foaming agent that reacts with isocyanate to yield carbon dioxide. The presence of water as an added component or in the filler also can result in the formation of polyurea bonds through the reaction of the water and isocyanate.

The addition of excess foaming agents or blowing agents above what is needed to complete the foaming reaction can add strength and stiffness to the organic polymer, improve the water resistance of the organic polymer, and increase the thickness and durability of the outer skin of the organic polymer. Such excessive blowing agent may produce a vigorously foaming reaction product. To contain the reaction product, a forming device that contains the pressure or restrains the materials from expanding beyond the design limits may be used, such as a stationary or continuous mold.

Surfactants can be used as wetting agents and to assist in mixing and dispersing the inorganic particulate material in a composite. Surfactants can also stabilize and control the size of bubbles formed during the foaming event and the resultant cell structure. Surfactants can be used, for example, in amounts below about 0.5 wt % based on the total weight of the mixture. Examples of surfactants useful with the polyurethanes described herein include anionic, non-ionic and cationic surfactants. For example, silicone surfactants such as DC-197 and DC-193 (Air Products; Allentown, Pa.) can be used.

Low molecular weight reactants such as chain-extenders and/or crosslinkers can be included in the organic polymers described herein. These reactants help the polyurethane system to distribute and contain the inorganic filler and/or fibers within the organic polymer. Chain-extenders are difunctional molecules, such as diols or diamines, that can polymerize to lengthen the urethane polymer chains. Examples of chain-extenders include ethylene glycol, 1,4-butanediol; ethylene diamine; 4,4'-methylenebis (2-chloroaniline) (MBOCA); diethyltoluene diamine (DETDA); and aromatic diamines such as Unilink 4200 (commercially available from UOP). Crosslinkers are tri- or greater functional molecules that can integrate into a polymer chain through two functionalities and provide one or more further functionalities (i.e., linkage sites) to crosslink to additional polymer chains. Examples of crosslinkers include glycerin, diethanolamine, trimethylolpropane, and sorbitol. In some composites, a crosslinker or chain-extender may be used to replace at least a portion of the at least one polyol used to produce a polyurethane as the organic polymer. For example, the polyurethane can be formed by the reaction of an isocyanate, a polyol, and a crosslinker.

Coupling agents and other surface treatments such as viscosity reducers, flow control agents, or dispersing agents can be added directly to the filler or fiber, or incorporated prior to, during, and/or after the mixing and reaction of the organic polymer. Coupling agents can allow higher filler loadings of an inorganic filler such as fly ash and may be used in small quantities. For example, the organic polymer may comprise about 0.01 wt % to about 0.5 wt % of a coupling agent. Examples of coupling agents useful with the organic polymers described herein include Ken-React LICA 38 and KEN-React KR 55 (Kenrich Petrochemicals; Bayonne, N.J.). Examples of dispersing agents useful with the organic polymers described herein include JEFFSPERSE X3202, JEFFSPERSE X3202RF, and JEFFSPERSE X3204 (Huntsman Polyurethanes; Geismar, La.).

Ultraviolet light stabilizers, such as UV absorbers, can be added to the organic polymers described herein. Examples of UV light stabilizers include hindered amine type stabilizers and opaque pigments like carbon black powder. Fire retardants can be included to increase the flame or fire resistance of the organic polymer. Antimicrobials can be used to limit the growth of mildew and other organisms on the surface of the composite. Antioxidants, such as phenolic antioxidants, can also be added. Antioxidants provide increased UV protection, as well as thermal oxidation protection.

Pigments or dyes can optionally be added to the organic polymers described herein. An example of a pigment is iron oxide, which can be added in amounts ranging from about 2 wt % to about 7 wt %, based on the total weight of the organic polymer.

In the inorganic polymer/organic polymer composite as described herein, the first layer can be directly adhered to the second layer. For example, the first layer and second layer can be adhered directly to one another without the use of an adhesive or binding layer. In some examples, an adhesive can be used to bond the first layer and the second layer. In some examples, the composite can include 75% or greater by weight of the organic polymer and 25% by weight or less of the inorganic polymer. For example, the composite can include 80% by weight of the organic polymer and 20% by weight of the inorganic polymer, 85% by weight of the organic polymer and 15% by weight of the inorganic polymer, 90% by weight of the organic polymer and 10% by weight of the inorganic polymer, or 95% by weight of the organic polymer and 5% by weight of the inorganic polymer.

The composite can include 25% by weight or less of the inorganic polymer. In some examples, the composite can include 20% by weight or less, 15% by weight or less, 10% by weight or less, or 5% by weight or less of the inorganic polymer. For example, the composite can include 24% by weight or less, 23% by weight or less, 22% by weight or less, 21% by weight or less, 20% by weight or less, 19% by weight or less, 18% by weight or less, 17% by weight or less, 16% by weight or less, 15% by weight or less, 14% by weight or less, 13% by weight or less, 12% by weight or less, 11% by weight or less, 10% by weight or less, 9% by weight or less, 8% by weight or less, 7% by weight or less, 6% by weight or less, 5% by weight or less, of the inorganic polymer.

The composite can include 75% by weight or greater of the organic polymer. In some examples, the composite can include 80% by weight or greater, 85% by weight or greater, 90% by weight or greater, or 95% by weight or greater of the organic polymer. For example, the composite can include 76% by weight or greater, 77% by weight or greater, 78% by weight or greater, 79% by weight or greater, 80% by weight or greater, 81% by weight or greater, 82% by weight or greater, 83% by weight or greater, 84% by weight or greater, 85% by weight or greater, 86% by weight or greater, 87% by weight or greater, 88% by weight or greater, 89% by weight or greater, 90% by weight or greater, 91% by weight or greater, 92% by weight or greater, 93% by weight or greater, 94% by weight or greater, 95% by weight or greater, 96% by weight or greater, 97% by weight or greater, 98% by weight or greater, or 99% by weight or greater of the organic polymer.

A method of producing an inorganic polymer/organic polymer composite is also described herein. The method includes mixing water and reactants comprising a reactive powder, an activator, and optionally a retardant to produce an inorganic polymer reactive mixture, applying a first layer to a surface, and applying a second layer to a surface of the first layer. In the method, one of the first layer and the second layer is the inorganic polymer reactive mixture and the other of the first layer and the second layer is an organic polymer.

As described above, the inorganic polymer reactive mixture is prepared by mixing water and the reactants as described herein. The components can be mixed from 2 seconds to 5 minutes. In some examples, the reactants are mixed for a period of 15 seconds or less (e.g., 2 to 10 or 4 to 10 seconds). The mixing times, even in the order of 15 seconds or less, result in a homogenous mixture. The mixing can be performed at an elevated temperature (e.g., up to 160° F.) or at ambient temperature. In some embodiments, the mixing occurs at ambient temperature. The reactants are allowed to react to form the inorganic polymer reactive mixture.

The inorganic polymer reactive mixtures can be produced using a batch, semi-batch, or continuous process. At least a portion of the mixing step, reacting step, or both, can be conducted in a mixing apparatus such as a high speed mixer or an extruder. The method can further include the step of extruding the resulting composition through a die or nozzle. In examples where the activator includes more than one component, the components can be pre-mixed prior to reacting with the reactive powder and optionally the retardant, as noted above. In some embodiments, a mixing step of the method used to prepare the compositions described herein includes: (1) combining the activators in either solid form or aqueous solution (e.g., combining an aqueous solution of citric acid with an aqueous solution of sodium hydroxide) and adding any additional water to provide a desired concentration for the activator solution; and 2) mixing the activator solution with the reactive powder and aggregate.

An ultrasonic or vibrating device can be used for enhanced mixing and/or wetting of the various components of the compositions described herein. Such enhanced mixing and/or wetting can allow a high concentration of reactive powder to be mixed with the other reactants. The ultrasonic or vibrating device produces an ultrasound of a certain frequency that can be varied during the mixing and/or extrusion process. Alternatively, a mechanical vibrating device can be used. The ultrasonic or vibrating device useful in the preparation of compositions described herein can be attached to or adjacent to an extruder and/or mixer. For example, the ultrasonic or vibrating device can be attached to a die or nozzle or to the exit port of an extruder or mixer. An ultrasonic or vibrating device may provide de-aeration of undesired gas bubbles and better mixing for the other components, such as blowing agents, plasticizers, and pigments.

As described above, the method for preparing the composites further includes applying a first layer to a surface and applying a second layer to a surface of the first layer. Suitable surfaces for application of the first layer include, for example, molds or conveying belts. The molds or conveying belts can be formed from metal, rubber, polyurethane, latex, and mixtures of these. In some embodiments, the first layer is the inorganic polymer reactive mixture and the second layer is the organic polymer. In these examples, a layer of the inorganic polymer reactive mixture can be applied to a surface and a layer of the organic polymer can be applied to a surface of the inorganic polymer reactive mixture. In some examples, the organic polymer layer can be applied directly onto the inorganic polymer layer; however, an adhesive layer can be applied between the organic polymer layer and inorganic polymer layer. The inorganic polymer reactive mixture can be allowed to cure and/or set prior to applying the organic polymer layer or the organic polymer layer can be applied prior to curing and/or setting of the inorganic polymer. In some examples, the organic polymer layer can be extruded onto the inorganic polymer layer.

In other embodiments, the first layer is the organic polymer and the second layer is the inorganic polymer reactive mixture. In these examples, a layer of the organic polymer can be applied to a surface and a layer of the inorganic polymer reactive mixture can be applied to a surface of the organic polymer. In some examples, the inorganic polymer layer can be applied directly onto the organic polymer layer; however, an adhesive layer can be applied between the inorganic polymer layer and organic polymer layer. The organic polymer reactive mixture can be allowed to cure prior to applying the inorganic polymer reactive mixture layer or the inorganic polymer reactive mixture can be applied prior to curing of the organic polymer. In some examples, the inorganic polymer reactive mixture layer can be extruded onto the organic polymer layer.

The inorganic polymer layer can be up to 25 mm in thickness. In some examples, the inorganic polymer layer can be from 1 mm to 20 mm, from 3 mm to 15 mm or from 5 mm to 10 mm thick. For example, the inorganic polymer layer can be 25 mm or less, 20 mm or less, 15 mm or less, 10 mm or less, 9 mm or less, 8 mm or less, 7 mm or less, 6 mm or less, 5 mm or less, 4 mm or less, 3 mm or less, or 2 mm or less.

The organic polymer layer can range from 5 mm to 250 mm in thickness. In some examples, the organic polymer layer can be from 10 mm to 200 mm, from 15 mm to 150 mm, from 20 mm to 100 mm, or from 25 mm to 50 mm. For example, the organic polymer layer can be 5 mm or more, 10 mm or more, 15 mm or more, 20 mm or more, 25 mm or more, 30 mm or more, 35 mm or more, 40 mm or more, 45 mm or more, 50 mm or more, 100 mm or more, 150 mm or more, or 200 mm or more.

Optionally, the layers of the inorganic polymer/organic polymer composite can be allowed to cure together. In some examples, the composite is allowed to cure at ambient temperature, for example, for up to 24 hours. For example, the molded product can be cured at ambient temperature for 24 hours or less, 18 hours or less, 12 hours or less, 6 hours or less, 5 hours or less, 4 hours or less, 3 hours or less, 2 hours or less, 1 hour or less, or 30 minutes or less at ambient temperature.

The inorganic polymer layer, the organic polymer layer, or the inorganic polymer/organic polymer composite can be cured at an elevated temperature. In some embodiments, the inorganic polymer layer is allowed to cure at an elevated temperature of 250° F. to 500° F. (instead of or in addition to the ambient temperature cure). The curing temperature for the inorganic polymer layer can be from 275° F. to 475° F., 300° F. to 450° F., or 325° F. to 400° F. For example, the curing temperature for the inorganic polymer layer can be 500° F. or less, 450° F. or less, 400° F. or less, 350° F. or less, or 300° F. or less. In some examples, the curing temperature for the inorganic polymer layer can be 250° F. or greater, 275° F. or greater, 300° F. or greater, 325° F. or greater, 375° F. or greater, 400° F. or greater, 425° F. or greater, 450° F. or greater, or 475° F. or greater.

In some embodiments, the organic polymer layer is allowed to cure at an elevated temperature of up to 300° F. either alone or with the inorganic polymer in the inorganic polymer/organic polymer composite (instead of or in addition to the ambient temperature cure). The curing temperature for the organic polymer layer can be from 150° F. to 300° F., 175° F. to 275° F., or 200° F. to 250° F. For example, the curing temperature for the organic polymer layer can be 300° F. or less, 275° F. or less, 250° F. or less, 225° F. or less, or 200° F. or less. In some examples, the curing temperature for the organic polymer layer can be 150° F. or greater, 175° F. or greater, 200° F. or greater, 225° F. or greater, 250° F. or greater, or 275° F. or greater.

The curing can be performed for up to 10 hours. For example, the curing can be performed for 10 hours or less, 9 hours or less, 8 hours or less, 7 hours or less, 6 hours or less, 5 hours or less, 4 hours or less, 3 hours or less, 2 hours or less, 1 hour or less, or less than 1 hour.

The method can further include allowing the product to set. The product can be allowed to set, for example, in the shaping mold used in the forming step. The composition can have a set time in the mold, for example, of from 1 to 300 minutes and can be less than 15 minutes (e.g., 2-5 minutes).

The inorganic polymer/organic polymer composites described herein can be formed into shaped articles and used in various applications, including building materials. Examples of such building materials include synthetic stone, roofing tiles (e.g., shake and slate tile), ceramic tiles, architectural stone, thin bricks, bricks, pavers, panels, underlay (e.g., bathroom underlay), banisters, lintels, pipe, posts, signs, guard rails, retaining walls, park benches, tables, railroad ties, and other shaped articles. In some examples, the inorganic polymer/organic polymer composites can be formed into panels that resemble stucco, cement, stone, or brick.

The composites, materials, and methods of the appended claims are not limited in scope by the specific composites, materials, and methods described herein, which are intended as illustrations of a few aspects of the claims and any composites, materials, and methods that are functionally equivalent are intended to fall within the scope of the claims. Various modifications of the composites, materials, and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed.

What is claimed is:

1. An inorganic polymer/organic polymer composite, comprising:
    a first layer comprising an inorganic polymer formed by reacting in the presence of water: a reactive powder comprising 85% by weight or greater fly ash, based on the total weight of the reactive powder and less than 10% by weight portland cement, based on the total weight of the reactive powder; and an activator; and
    a second layer adhered to the first layer comprising an organic polymer and from 40% to 90% by weight fly ash, based on the total weight of the second layer.

2. An inorganic polymer/organic polymer composite, comprising:
    a first layer comprising an inorganic polymer formed by reacting in the presence of water: a reactive powder comprising fly ash and less than 10% by weight portland cement, based on the total weight of the reactive powder; and an activator; and
    a second layer adhered to the first layer comprising an organic polymer and from 40% to 90% by weight fly ash, based on the total weight of the second layer.

3. The composite of claim 2, wherein the fly ash in the first layer is present in an amount of greater than 85% by weight of the reactive powder.

4. The composite of claim 1, wherein the reactive powder includes less than 5% by weight of portland cement.

5. The composite of claim 1, wherein greater than 75% of the fly ash in the first layer comprises Class C fly ash.

6. The composite of claim 1, wherein the activator includes citric acid.

7. The composite of claim 1, wherein the activator includes sodium hydroxide.

8. The composite of claim 1, wherein the inorganic polymer is substantially free from retardants.

9. The composite of claim 1, wherein the inorganic polymer further comprises fibers.

10. The composite of claim 1, wherein the inorganic polymer further comprises a photocatalyst.

11. The composite of claim 1, wherein the weight ratio of water to reactive powder is from 0.06:1 to 0.25:1.

12. The composite of claim 1, wherein the organic polymer is a polyurethane.

13. The composite of claim 12, wherein the polyurethane is foamed.

14. The composite of claim 1, wherein the first layer is directly adhered to the second layer without the use of an adhesive layer.

15. The composite of claim 1, wherein the composite includes 75% by weight or greater of the second layer and 25% by weight or less of the first layer.

16. A building material comprising the composite of claim 1.

17. The building material of claim 16, wherein the building material is a synthetic stone or a panel.

18. The composite of claim 2, wherein greater than 75% of the fly ash in the inorganic polymer reactive mixture comprises Class C fly ash.

19. The composite of claim 2, wherein the inorganic polymer is substantially free from retardants.

* * * * *